United States Patent
Satoh et al.

(10) Patent No.: US 6,852,451 B2
(45) Date of Patent: Feb. 8, 2005

(54) NONAQUEOUS ELECTROLYTE SECONDARY BATTERY HAVING A CARBONACEOUS MATERIAL CONTAINING NEGATIVE ELECTRODE AND A NONAQUEOUS ELECTROLYTE CONTAINING A NONAQUEOUS SOLVENT

(75) Inventors: Asako Satoh, Yokohama (JP); Masashi Fujiwara, Chigasaki (JP); Kaoru Koiwa, Tokyo (JP); Masahiro Sekino, Kawasaki (JP); Nao Shimura, Kawasaki (JP); Hiroyuki Hasebe, Chigasaki (JP); Masayuki Oguchi, Yokohama (JP); Masayuki Onuma, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 246 days.

(21) Appl. No.: 09/945,808

(22) Filed: Sep. 5, 2001

(65) Prior Publication Data
US 2002/0055047 A1 May 9, 2002

(30) Foreign Application Priority Data
Sep. 6, 2000 (JP) ........................... 2000-270529
Feb. 28, 2001 (JP) ........................... 2001-054938

(51) Int. Cl.⁷ ............................................... H01M 6/16
(52) U.S. Cl. .................... 429/337; 429/188; 429/218.1; 429/231.4; 429/231.9
(58) Field of Search ............................. 429/155, 218.1, 429/231.4, 231.9, 337

(56) References Cited
U.S. PATENT DOCUMENTS
5,753,387 A  5/1998  Takami et al.
5,900,336 A  5/1999  Kabata et al.
6,503,657 B1 * 1/2003 Takami et al. .............. 429/188

FOREIGN PATENT DOCUMENTS
| EP | 1011161 A1 * | 11/1999 | ............ H01M/4/58 |
| EP | 0 997 960 A2 A3 | 5/2000 | |
| EP | 1 011 161 A2 A3 | 6/2000 | |
| EP | 1 083 618 A1 | 3/2001 | |
| EP | 1 089 366 A1 | 4/2001 | |
| JP | 6-318459 | 11/1994 | |
| JP | 8-339824 | 12/1996 | |
| JP | 10-121054 | * 5/1998 | ............ C10C/3/02 |
| JP | 10-247518 | 9/1998 | |
| JP | 2000-40510 | * 2/2000 | ............ H01M/4/58 |
| WO | WO 99/60652 | 11/1999 | |

OTHER PUBLICATIONS
U.S. Appl. No. 09/945,808, filed Sep. 5, 2001, Satoh et al.
U.S. Appl. No. 10/355,304, filed Jan. 31, 2003, Sekino et al.
U.S. Appl. No. 09/961,138, filed Sep. 24, 2001, pending.
U.S. Appl. No. 10/026,816, filed Dec. 27, 2001, pending.
U.S. Appl. No. 09/985,369, filed Nov. 2, 2001, pending.
U.S. Appl. No. 09/945,808. filed Sep. 5, 2001, pending.

* cited by examiner

Primary Examiner—Dah-Wei Yuan
(74) Attorney, Agent, or Firm—Oblon, Spivak, McClelland, Maier & Neustadt, P.C.

(57) ABSTRACT

Disclosed is a nonaqueous electrolyte secondary battery, comprising a case having a wall thickness not larger than 0.3 mm, a positive electrode provided in the case, a negative electrode provided in the case and the negative electrode containing a carbonaceous material capable of absorbing-desorbing lithium ions, and a nonaqueous electrolyte provided in the case and the nonaqueous electrolyte containing a nonaqueous solvent including γ-butyrolactone and a solute dissolved in the nonaqueous solvent, wherein after being discharged to 3V with a current of 0.2 C at room temperature, the voltage reduction caused by the self-discharge at 60° C. is not larger than 1.5V in 3 weeks.

27 Claims, 4 Drawing Sheets

NONAQUEOUS ELECTROLYTE SECONDARY BATTERY HAVING A CARBONACEOUS MATERIAL CONTAINING NEGATIVE ELECTRODE AND A NONAQUEOUS ELECTROLYTE CONTAINING A NONAQUEOUS SOLVENT

CROSS-REFERENCE TO RELATED APPLICATIONS

This application is based upon and claims the benefit of priority from the prior Japanese Patent Applications No. 2000-270529, filed Sep. 6, 2000; and No. 2001-054938, filed Feb. 28, 2001, the entire contents of both of which are incorporated herein by reference.

BACKGROUND OF THE INVENTION

1. Field of the Invention

The present invention relates to a nonaqueous electrolyte secondary battery.

2. Description of the Related Art

As a nonaqueous electrolyte secondary battery for a portable electronic appliance such as a portable telephone, a thin lithium ion secondary battery is being commercialized in recent years. Proposed as such a thin lithium ion secondary battery is a battery comprising an electrode group comprising a positive electrode, a negative electrode and a separator interposed between the positive and negative electrodes. The electrode group is impregnated with a nonaqueous electrolyte and is housed in a case formed of a laminate film so as to provide the thin lithium ion secondary battery. The active material contained in the positive electrode of the secondary battery is formed of, for example, a lithium complex oxide, and a carbonaceous material capable of absorbing-desorbing lithium ions is contained in the negative electrode. It should be noted that, during storage of the charged secondary battery of the particular structure under high temperatures, the nonaqueous electrolyte tends to react with the positive electrode, with the result that the nonaqueous electrolyte tends to be decomposed by oxidation so as to generate a gas. What should be noted is that the case formed of a laminate film is swollen by the gas generation so as to do damage to the electronic appliance. In order to suppress the deformation of the case caused by the gas generation, it is conceivable to use a nonaqueous electrolyte prepared by dissolving a solute in a nonaqueous solvent containing γ-butyrolactone.

It should be noted that a protective film called an SEI (Solid electrolyte interphase) is formed on the surface of the negative electrode so as to ensure a sufficient charging-discharging of the negative electrode. However, where the secondary battery is stored under a high temperature environment for a long time, the SEI is denatured by some reasons so as to impair the stability of the negative electrode. In such a case, the self-discharge tends to be increased.

BRIEF SUMMARY OF THE INVENTION

An object of the present invention is to improve the self-discharge characteristics of a nonaqueous electrolyte secondary battery comprising a nonaqueous electrolyte containing γ-butyrolactone.

According to a first aspect of the present invention, there is provided a nonaqueous electrolyte secondary battery, comprising:

a case having a wall thickness not larger than 0.3 mm;

a positive electrode provided in the case;

a negative electrode provided in the case and containing a carbonaceous material capable of absorbing-desorbing lithium ions; and a nonaqueous electrolyte provided in the case and containing a nonaqueous solvent including γ-butyrolactone and a solute dissolved in the nonaqueous solvent;

wherein after being discharged to 3V with a current of 0.2 C at room temperature, the voltage reduction caused by the self-discharge at 60° C. is not larger than 1.5V in 3 weeks.

According to a second aspect of the present invention, there is provided a nonaqueous electrolyte secondary battery, comprising:

a case having a wall thickness not larger than 0.3 mm;

a positive electrode provided in the case;

a negative electrode provided in the case and containing a carbonaceous material capable of absorbing-desorbing lithium ions; and a nonaqueous electrolyte provided in the case and containing a nonaqueous solvent including γ-butyrolactone and a solute dissolved in the nonaqueous solvent;

wherein formula (1) given below is satisfied:

$$C_{20} \leq 0.98 \times C_{60} \tag{1}$$

where $C_{20}$ represents a negative electrode capacity obtained when the negative electrode of the secondary battery at the time of starting its use is charged to 0.01V versus Li with a current of 0.2 C at 20° C., followed by discharging the negative electrode to 1.5V versus Li with a current of 0.2 C at 20° C., and $C_{60}$ represents a negative electrode capacity obtained when the negative electrode of the secondary battery at the time of starting its use is charged to 0.01V versus Li with a current of 0.2 C at 60° C., followed by discharging the negative electrode to 1.5V versus Li with a current of 0.2 C at 60° C.

According to a third aspect of the present invention, there is provided a nonaqueous electrolyte secondary battery, comprising:

a case having a wall thickness not larger than 0.3 mm;

a positive electrode provided in the case;

a negative electrode provided in the case and containing a carbonaceous material capable of absorbing-desorbing lithium ions; and a nonaqueous electrolyte provided in the case and containing a nonaqueous solvent including γ-butyrolactone and a solute dissolved in the nonaqueous solvent;

wherein a shift value of a peak derived from lithium absorbed in the carbonaceous material of the negative electrode under the state that the secondary battery is fully charged to 4.2V is detected in −1 to 20 ppm and 40 to 50 ppm in the solid state $^7$Li-NMR using a magic angle spinning method (MAS method).

According to a fourth aspect of the present invention, there is provided a nonaqueous electrolyte secondary battery, comprising:

a case having a wall thickness not larger than 0.3 mm;

a positive electrode provided in the case;

a negative electrode provided in the case and containing a carbonaceous material capable of absorbing-desorbing lithium ions; and a nonaqueous electrolyte provided in the case and containing a nonaqueous solvent including γ-butyrolactone and a solute dissolved in the nonaqueous solvent;

wherein the carbonaceous material contains at least 90 parts by weight of carbonaceous material A having an average layer spacing $d_{002}$ derived from (002) reflection, which is obtained by a powder X-ray diffraction, of 0.337 nm or less and 1 to 10 parts by weight of carbonaceous material B having an average layer spacing $d_{002}$ derived from (002) reflection, which is obtained by a powder X-ray diffraction, of 0.36 to 0.4 nm.

According to a fifth aspect of the present invention, there is provided a nonaqueous electrolyte secondary battery, comprising:

a case having a wall thickness not larger than 0.3 mm;

a positive electrode provided in the case;

a negative electrode provided in the case and containing a carbonaceous material capable of absorbing-desorbing lithium ions; and a nonaqueous electrolyte provided in the case and containing a nonaqueous solvent including γ-butyrolactone and a solute dissolved in the nonaqueous solvent;

wherein the carbonaceous material contains at least 90 parts by weight of a carbonaceous material obtained by subjecting a carbonaceous material precursor to a heat treatment at 2,500° C. or more and 1 to 10 parts by weight of a carbonaceous material obtained by subjecting a carbonaceous material precursor to a heat treatment at 900° C. or less.

According to a sixth aspect of the present invention, there is provided a nonaqueous electrolyte secondary battery, comprising:

a case having a wall thickness not larger than 0.3 mm;

a positive electrode provided in the case;

a negative electrode provided in the case and containing a carbonaceous material capable of absorbing-desorbing lithium ions; and a nonaqueous electrolyte provided in the case and containing a nonaqueous solvent including γ-butyrolactone and a solute dissolved in the nonaqueous solvent;

wherein a lithium remaining amount in the negative electrode under the state that the secondary battery is discharged to 3V under a current of 0.2 C at room temperature falls within a range of between 1.1% by weight and 2% by weight based on the carbonaceous material.

Further, according to a seventh aspect of the present invention, there is provided a nonaqueous electrolyte secondary battery, comprising:

a case having a wall thickness not larger than 0.3 mm;

a positive electrode provided in the case;

a negative electrode provided in the case and containing a carbonaceous material capable of absorbing-desorbing lithium ions; and a nonaqueous electrolyte provided in the case and containing a nonaqueous solvent including γ-butyrolactone and a solute dissolved in the nonaqueous solvent;

wherein lithium absorbed in the carbonaceous material of the negative electrode under the state that the secondary battery is discharged to 3V under a current of 0.2 C at room temperature exhibits a half-width of a main peak being 70 ppm (10,000 Hz) or less in the solid state $^7$Li-NMR spectrum measured by a magic angle spinning method (MAS method).

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out hereinafter.

BRIEF DESCRIPTION OF THE SEVERAL VIEWS OF THE DRAWINGS

The accompanying drawing, which are incorporated in and constitute a part of the specification, illustrate embodiments of the present invention, and together with the general description given above and the detailed description of the embodiments given below, serve to explain the principles of the present invention.

DETAILED DESCRIPTION OF THE INVENTION

Figure 1:
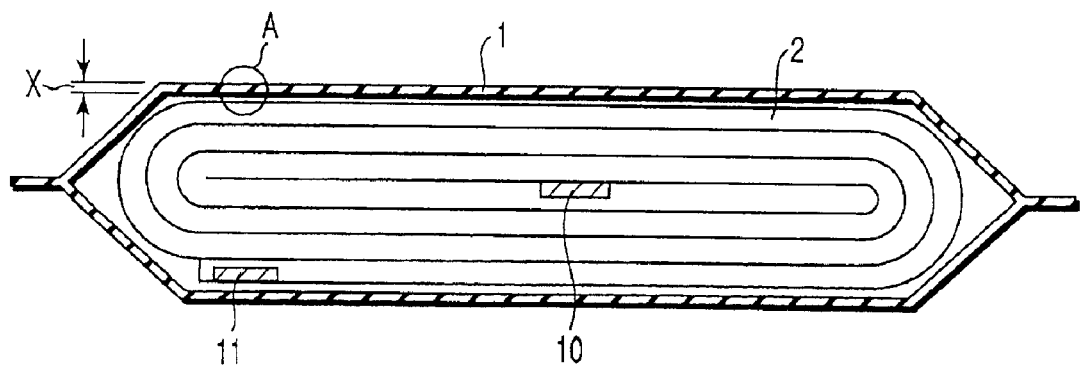
FIG. 1 is a cross sectional view showing the construction of a thin lithium ion secondary battery as an example of a nonaqueous electrolyte secondary battery of the present invention.

The nonaqueous electrolyte secondary battery of the present invention comprises a case whose wall thickness is not larger than 0.3 mm, a positive electrode arranged within the case, a negative electrode arranged within the case and containing a carbonaceous material capable of absorbing-desorbing lithium ions, and a nonaqueous electrolyte housed in the case and containing a nonaqueous solvent including γ-butyrolactone and a solute dissolved in the nonaqueous solvent.

In the present invention, it is possible to use a negative electrode selected from negative electrodes A, B, C, D, and E each containing a carbonaceous material. It is possible to improve any of the self-discharge characteristics, the discharge capacity and the charge-discharge cycle life by using a carbonaceous material having the features of at least two carbonaceous materials contained in negative electrodes A to E noted above.

The carbonaceous material contained in negative electrode A contains at least 90 parts by weight of carbonaceous material A having an average layer spacing $d_{002}$ derived from (002) reflection, which is obtained by a powder X-ray diffraction, of 0.337 nm or less and 1 to 10 parts by weight of carbonaceous material B having an average layer spacing $d_{002}$ derived from (002) reflection, which is obtained by a powder X-ray diffraction, of at least 0.36 nm.

The shift value of the peak derived from lithium absorbed in the carbonaceous material of negative electrode B under the state that the secondary battery is fully charged to 4.2V is detected in −1 to 20 ppm and 40 to 50 ppm in the solid state $^7$Li-NMR spectrum measured by a magic angle spinning method (MAS method).

Negative electrode C satisfies formula (1) given below:

$$C_{20} \leq 0.98 \times C_{60} \qquad (1)$$

where $C_{20}$ represents a negative electrode capacity obtained when the negative electrode of the secondary battery at the time of starting its use is charged to 0.01V versus Li with a current of 0.2 C at 20° C., followed by discharging the negative electrode to 1.5V versus Li with a current of 0.2 C at 20° C., and $C_{60}$ represents a negative electrode capacity obtained when the negative electrode of the secondary battery at the time of starting its use is charged to 0.01V versus Li with a current of 0.2 C at 60° C., followed by discharging the negative electrode to 1.5V versus Li with a current of 0.2 C at 60° C.

It should be noted that "1C" denotes the current value required for discharging a nominal capacity (Ah) in one hour. Therefore, 0.2 C denotes the current value required for discharging the nominal capacity (Ah) in 5 hours. Also, the expression "to charge to 0.01V versus Li" denotes that the battery is charged to 0.01V in terms of the potential relative to the metal lithium.

In negative electrode D, the remaining lithium amount under the state that the battery is discharged to 3V with the current of 0.2 C at room temperature falls within a range of between 1.1% by weight and 2% by weight relative to 100% by weight of the carbonaceous material.

Further, lithium absorbed in the carbonaceous material of the negative electrode E under the state that the secondary battery is discharged to 3V under a current of 0.2 C at room temperature exhibits a half-width of a main peak of 70 ppm (10,000 Hz) or less in the solid state $^7$Li-NMR spectrum measured by a magic angle spinning method (MAS method).

As the nonaqueous electrolyte, it is possible to use, for example, a liquid nonaqueous electrolyte consisting essentially of the nonaqueous solvent and the solute, and a gel-like nonaqueous electrolyte containing the nonaqueous solvent, the solute and a polymer. Particularly, it is desirable to use a liquid nonaqueous electrolyte as the nonaqueous electrolyte. It is possible to increase the ionic conductance by using a liquid nonaqueous electrolyte.

A first nonaqueous electrolyte secondary battery and a second nonaqueous electrolyte secondary battery will now be described as examples of the nonaqueous electrolyte secondary battery of the present invention.

1. First Nonaqueous Electrolyte Secondary Battery

A first nonaqueous electrolyte secondary battery of the present invention comprises a case substantially formed of a sheet material having a thickness not larger than 0.3 mm, an electrode group housed in the case and the electrode group including a negative electrode, a positive electrode and a separator arranged between the positive and negative electrodes, and a liquid nonaqueous electrolyte impregnating the electrode group and the liquid nonaqueous electrolyte prepared by dissolving a solute in a nonaqueous solvent including γ-butyrolactone. Any of negative electrodes A to E described above is used as the negative electrode. It is possible to improve any of the self-discharge characteristics, the discharge capacity and the charge-discharge cycle life of the secondary battery by using a carbonaceous material exhibiting the features of at least two carbonaceous materials of negative electrodes A to E.

Each of the electrode group, the positive electrode, the negative electrode, the separator, the liquid nonaqueous electrolyte, and the case will now be described.

(1) Electrode Group

In the electrode group, it is desirable for a positive electrode, a negative electrode and a separator to be formed integral. The electrode group of the particular construction can be formed by, for example, the method described below.

Specifically, a laminate structure comprising a positive electrode, a negative electrode and a separator located between the positive and negative electrodes is wound in a flat shape so as to prepare a flattened material. Alternatively, a laminate structure comprising a positive electrode, a negative electrode and a separator located between the positive and negative electrodes is spirally wound, followed by compressing the wound structure in a radial direction so as to prepare a flattened material. It is also possible for a laminate structure comprising a positive electrode, a negative electrode and a separator located between the positive and negative electrodes to be folded at least once so as to prepare a flattened material. Then, a thermal molding is applied in the laminate direction of the resultant flattened material so as to thermally cure the binder contained in the positive electrode and the negative electrode, thereby making the positive electrode, the negative electrode and the separator integral and, thus, obtaining a desired electrode group.

The thermal molding can be applied either before or after the flattened material is housed in the case. It is desirable for thermal molding to be performed under an atmosphere of a reduced pressure including vacuum or under an atmosphere of an atmospheric pressure. The molding can be performed by, for example, a pressing or by the loading in a mold. It is desirable for the temperature of the thermal molding to fall within a range of between 40° C. and 120° C., preferably between 60° C. and 100° C. Also, it is desirable for the pressure in the thermal molding to fall within a range of between 0.01 and 20 kg/cm$^2$, preferably between 8 and 15 kg/cm$^2$.

It is also possible to obtain the electrode group by bonding the positive electrode, the negative electrode and the separator by using a polymer having a adhesivity in place of preparing the electrode group by the method described above. It is possible for the polymer having a adhesivity to be selected from the group consisting of, for example, polyacrylonitrile (PAN), polyacrylate (PMMA), polyvinylidene fluoride (PVdF), polyvinyl chloride (PVC), and polyethylene oxide (PEO).

2) Positive Electrode

The positive electrode comprises a positive electrode layer containing an active material. The positive electrode layer is formed on one surface or both surfaces of a current collector.

The positive electrode layer contains a positive electrode active material, a binder and a conducting agent.

The positive electrode active material includes various oxides such as manganese dioxide, lithium manganese complex oxide, lithium-containing nickel oxide, lithium-containing cobalt oxide, lithium-containing nickel cobalt oxide, lithium-containing iron oxide, lithium-containing vanadium oxide, as well as chalcogen compounds such as titanium disulfide, and molybdenum disulfide. Particularly, it is desirable to use a lithium-containing cobalt oxide, e.g., $LiCoO_2$, a lithium-containing nickel cobalt oxide, e.g., $LiNi_{0.8}Co_{0.2}O_2$, and a lithium manganese complex oxide, e.g., $LiMn_2O_4$, and $LiMnO_2$, because these positive electrode active materials permit obtaining a high voltage.

The conducting agent used in the present invention includes, for example, acetylene black, carbon black and graphite.

The binder used in the present invention can permit the active material to be held by the current collector and also can permit the active material particles to be joined to each other. The binder used in the present invention includes, for example, polytetrafluoro ethylene (PTFE), polyvinylidene fluoride (PVdF), ethylene-propylene-diene copolymer (EPDM), and styrene-butadiene rubber (SBR).

It is desirable for the mixing ratio of the positive electrode active material to fall within a range of between 80 and 95% by weight, for the mixing ratio of the conducting agent to fall within a range of between 3 and 20% by weight, and for the mixing ratio of the binder to fall within a range of between 2 and 7% by weight.

A conductive substrate of a porous structure or a conductive substrate of a nonporous structure can be used as the current collector. It is possible for the conductive substrate to be formed of, for example, aluminum, stainless steel or nickel.

The positive electrode can be prepared by, for example, suspending a positive electrode active material, a conducting agent and a binder in a suitable solvent, followed by coating the current collector with the resultant suspension and subsequently drying the coated suspension and pressing the coated current collector, thereby preparing a thin plate-like positive electrode.

It is possible for the positive electrode to further contain a polymer material having an adhesivity.

3-1) Negative Electrode A

Negative electrode A comprises a negative electrode layer containing a carbonaceous material capable of absorbing-desorbing lithium ions and a binder. The negative electrode layer is formed on one surface or both surfaces of a current collector.

The carbonaceous material contains 90 to 99 parts by weight of carbonaceous material A having 0.337 nm or less of the average layer spacing $d_{002}$ derived from (002) reflection, which is obtained by a powder X-ray diffraction, and 1 to 10 parts by weight of carbonaceous material B having at least 0.36 nm of the average layer spacing $d_{002}$ derived from (002) reflection, which is obtained by a powder X-ray diffraction.

It is more desirable for the average layer spacing $d_{002}$ of the carbonaceous material A to be not larger than 0.3365 nm. Also, it is desirable for the lower limit of the average layer spacing $d_{002}$ to be equal to the average layer spacing $d_{002}$ derived from (002) reflection in a perfect graphite crystal, i.e., to be set at 0.3354 nm.

Carbonaceous material A used in the present invention includes, for example, a material obtained by applying a heat treatment to a carbonaceous material precursor at 2,500° C. or more, a graphitized material, vapor grown carbon, and a coke. The graphitized material used in the present invention includes, for example, a natural graphite of a scale structure, a spherical graphite, a synthetic graphite, and a material obtained by applying, for example, a surface treatment to a natural graphite. On the other hand, the carbonaceous material precursor used in the present invention includes, for example, a thermosetting resin, an isotropic pitch, mesophase pitch, a mesophase pitch-based carbon fiber, and mesophase pitch-based microbeads. Particularly, it is desirable to use mesophase pitch, a mesophase pitch-based carbon fiber and mesophase pitch-based microbeads as the carbonaceous material precursor material. It is more desirable for the heat treatment noted above to be performed at 2,500 to 3,000° C. Where the heat treatment is performed under the temperature noted above, it is possible to obtain carbonaceous material A capable of absorbing-desorbing a large amount of lithium ions. It is furthermore desirable for the heat treatment noted above to be performed at 2,800 to 3,000° C. A single or a plurality of kinds of carbonaceous material A can be used in the present invention.

If the average layer spacing $d_{002}$ of carbonaceous material B falls within a range of larger than 0.337 nm and smaller than 0.36 nm, it is difficult to improve the self-discharge characteristics of the secondary battery under high temperatures. It is more desirable for the average layer spacing $d_{002}$ of carbonaceous material B to be not smaller than 0.365 nm. It should be noted, however, that, if an average layer spacing $d_{002}$ exceeding 0.4 nm is present in carbonaceous material B, the initial efficiency of the negative electrode is lowered, with the result that it is difficult to obtain a secondary battery having a large discharge capacity. Such being the situation, it is desirable for the upper limit of the average layer spacing $d_{002}$ to be set at 0.4 nm, preferably at 0.39 nm, and more preferably at 0.38 nm. Incidentally, the average layer spacing of the negative electrode represents a value calculated from the diffraction spectrum of XRD without the scattering correction.

It is possible to obtain carbonaceous material B by applying a heat treatment at 900° C. or less to a carbonaceous material precursor. The carbonaceous material precursor used in the present invention includes, for example, a thermosetting resin, an isotropic pitch, mesophase pitch, a mesophase pitch-based carbon fiber, and mesophase pitch-based microbeads. Particularly, it is desirable to use mesophase pitch, a mesophase pitch-based carbon fiber, and mesophase pitch-based microbeads as the carbonaceous material precursor. It is more desirable for the heat treatment noted above to be performed at 600 to 900° C. If the heat treatment is performed under the temperature noted above, it is possible to obtain carbonaceous material B having a relatively high absorption-desorption amount of lithium ions and having a low reactivity with GBL. It is furthermore desirable for the heat treatment to be performed at 650 to 850° C.

In the present invention, the mixing amount of carbonaceous material B is defined to fall within a range of between 1 part by weight and 10 parts by weight. If the mixing amount of carbonaceous material B is smaller than 1 part by weight, it is impossible to improve the self-discharge characteristics of the secondary battery during storage under high temperatures. On the other hand, if the mixing amount of carbonaceous material B exceeds 10 parts by weight, it is impossible to obtain a long life of the secondary battery. It is more desirable for the mixing amount of carbonaceous material B to fall within a range of between 1 part by weight and 8 parts by weight.

It is desirable for each of carbonaceous materials A and B to be in the form of a fiber having an aspect ratio R/L, where R represents an average fiber diameter and L represents an average fiber length, not smaller than 0.1 and smaller than 4. Where each of carbonaceous materials A and B is in the form of a fiber defined above, it is possible to suppress to the minimum level the nonuniformity of charging reaction and discharging reaction in the negative electrode, said nonuniformity being derived from the mixing of carbonaceous materials differing from each other in, for example, the crystallinity. It is more desirable for the aspect ratio of each of carbonaceous materials A and B to fall within a range of between 0.1 and 2.

It is desirable for the specific surface area determined by BET method of each of carbonaceous materials A and B to fall within a range of between 0.1 m²/g and 5 m²/g. If the specific surface area is smaller than 0.1 m²/g, the normal liberation-insertion reaction of lithium tends to be inhibited so as to impair the rate characteristics of the secondary battery. On the other hand, if the specific surface area is larger than 5 m²/g, it is difficult to improve sufficiently the self-discharge characteristics of the secondary battery. It is more desirable for the specific surface area of each of carbonaceous materials A and B to fall within a range of between 0.1 m²/g and 3 m²/g. It is possible for the specific surface areas of carbonaceous materials A and B to be equal to each other or to be different from each other.

Where a mixture of, for example, a graphitized material such as a synthetic graphite and a graphitized material of mesophase pitch is used as carbonaceous material A, it is desirable for the specific surface area of the graphitized material of mesophase pitch to fall within a range of between 0.1 and 5 m²/g and for the specific surface area of the graphitized material to fall within a range of between 0.1 and 20 m²/g. It is also desirable for the mixing ratio of the graphitized material of mesophase pitch to fall within a range of between 50 and 95 parts by weight based on the entire carbonaceous material, and for the mixing ratio of the graphitized material to fall within a range of between 5 and 50 parts by weight based on the entire carbonaceous material. The negative electrode containing carbonaceous material A meeting this requirement permits further improving the discharge capacity and the cycle life of the secondary battery. Incidentally, it is desirable for the graphitized material of mesophase pitch to be at least one material selected from the group consisting of a material obtained by applying a heat treatment to mesophase pitch at 2,500° C. or more, a material obtained by applying a heat treatment to a mesophase pitch-based carbon fiber at 2,500° C. or more, and a material obtained by applying a heat treatment to mesophase pitch-based microbeads at 2,500° C. or more.

The binder used in the present invention includes, for example, polytetrafluoro ethylene (PTFE), polyvinylidene fluoride (PVdF), ethylene-propylene-diene copolymer (EPDM), styrene-butadiene rubber (SBR), and carboxy methyl cellulose (CMC).

It is desirable for the mixing ratio of the carbonaceous material to fall within a range of between 90 and 98% by weight. Also, it is desirable for the mixing ratio of the binder to fall within a range of between 2 and 20% by weight.

A conductive substrate of a porous structure or a conductive substrate of a nonporous structure can be used as the current collector. It is possible for the current collector to be formed of, for example, copper, stainless steel or nickel.

For preparing negative electrode A, 90 to 99 parts by weight of carbonaceous material A, 1 to 10 parts by weight of carbonaceous material B and a binder are suspended and kneaded in the presence of a solvent. Then, the current collector is coated with the resultant suspension, followed by drying the coated suspension and pressing the coated current collector once or 2 to 5 times under a desired pressure so as to obtain a desired negative electrode A.

It is possible for negative electrode A to further contain a polymer material having an adhesivity.

It is desirable for the initial charging of the nonaqueous electrolyte secondary battery equipped with negative electrode A to be performed at 40 to 50° C. Since the charge-discharge capacity of carbonaceous material B is increased with elevation in temperature, it is possible to suppress the self-discharge by performing the initial charging under high temperatures of 40 to 50° C. It is more desirable for the initial charging temperature to fall within a range of between 40° C. and 45° C. It is most desirable for the initial charging to be performed by a 4.2V constant voltage charging under temperature of 40 to 50° C. and under a current of 0.2 C for 10 hours or more.

3-2) Negative Electrode B

The shift value of the peak derived from lithium inserted into the carbonaceous material of negative electrode B under the state that the secondary battery is fully charged to 4.2V is detected in −1 to 20 ppm and 40 to 50 ppm in the solid state $^7$Li-NMR spectrum measured by a magic angle spinning method (MAS method).

It is more desirable for the shift value in which the peak noted above is detected to be 5 to 20 ppm and 40 to 45 ppm. The negative electrode meeting this requirement permits further suppressing the self-discharge during storage of the secondary battery under high temperatures.

It is desirable for an integrated intensity ratio $I_A/I_B$, in which $I_A$ represents the integrated intensity of the peak detected in the shift value of −1 to 20 ppm, and $I_B$ represents the integrated intensity of the peak detected in the shift value of 40 to 50 ppm, to fall within a range of between 0.08 and 0.4. If the integrated intensity ratio $I_A/I_B$ is smaller than 0.08, it is difficult to suppress sufficiently the self-discharge during storage of the secondary battery under high temperatures. On the other hand, where the integrated intensity ratio $I_A/I_B$ exceeds 0.4, it is difficult to obtain a long charge-discharge cycle life. It is more desirable for the integrated intensity ratio $I_A/I_B$ to fall within a range of between 0.08 and 0.3.

It is desirable for the specific surface area determined by the BET method of the carbonaceous material contained in the negative electrode to fall within a range of between 0.1 m²/g and 5 m²/g. If the specific surface area is smaller than 0.1 m²/g, the normal lithium liberation-insertion reaction tends to be inhibited so as to impair the rate characteristics of the secondary battery. On the other hand, if the specific surface area is larger than 5 m²/g, it is difficult to improve sufficiently the self-discharge characteristics of the secondary battery. It is more desirable for the specific surface area to fall within a range of between 0.1 m²/g and 3 m²/g. Where a plurality of different kinds of carbonaceous materials are contained in the negative electrode, it is possible for the different carbonaceous materials to have the same specific surface areas or to have different specific surface areas as far as the specific surface area for each of the carbonaceous materials falls within a range of between 0.1 m²/g and 5 m²/g.

Also, it is possible for the carbonaceous material to include a first carbonaceous material having a specific surface area, which is determined by the BET method, falling within a range of between 0.1 m²/g and 5 m²/g and a second carbonaceous material having a specific surface area, which is determined by the BET method, falling within a range of between 0.1 m²/g and 20 m²/g. It should be noted that, in order to satisfy the self-discharge characteristics, the discharge capacity and the cycle life simultaneously, it is desirable for the mixing ratio of the first carbonaceous material to fall within a range of between 50 and 95 parts by weight based on the total carbonaceous material and for the mixing ratio of the second carbonaceous material to fall within a range of between 5 and 50 parts by weight based on the total carbonaceous material.

Negative electrode B can be prepared by, for example, suspending and kneading a carbonaceous material and a binder in the presence of a solvent, followed by coating a current collector with the resultant suspension and subsequently drying the coated suspension and pressing once or 2 to 5 times the coated current collector under a predetermined pressure. The carbonaceous material described previously in conjunction with negative electrode A, i.e., a mixture comprising 90 to 99 parts by weight of carbonaceous material A and 1 to 10 parts by weight of carbonaceous material B, can be used for preparing negative electrode B. Also, a composite material in which carbonaceous material A is covered with carbonaceous material B or a mixture comprising the particular composite material and the mixture noted above can be used as the carbonaceous material for preparing negative electrode B.

In negative electrode B thus prepared, when the secondary battery is fully charged to 4.2V, the peak derived from lithium absorbed in carbonaceous material B is detected in the shift value of −1 to 20 ppm, and the peak derived from lithium absorbed in carbonaceous material A is detected in the shift value of 40 to 50 ppm.

3-3) Negative Electrode C

Negative electrode C satisfies formula (1) given below:

$$C_{20} \leq 0.98 \times C_{60} \tag{1}$$

where $C_{20}$ represents a negative electrode capacity obtained when the negative electrode of the secondary battery at the time of starting its use is charged to 0.01V versus Li with a current of 0.2 C at 20° C., followed by discharging the negative electrode to 1.5V versus Li with a current of 0.2 C at 20° C., and $C_{60}$ represents a negative electrode capacity obtained when the negative electrode of the secondary battery at the time of starting its use is charged to 0.01V versus Li with a current of 0.2 C at 60° C., followed by discharging the negative electrode to 1.5V versus Li with a current of 0.2 C at 60° C.

If a ratio of the negative electrode capacity $C_{20}$ at 20° C. to the negative electrode capacity $C_{60}$ at 60° C. exceeds 98%, it is impossible to suppress the progress of the self-discharge. Also, if a ratio of the negative electrode capacity $C_{20}$ at 20° C. to the negative electrode capacity $C_{60}$ at 60° C. is smaller than 80%, it is difficult to obtain a high charge-discharge characteristics at room temperature. It follows that it is desirable for a ratio of the negative electrode capacity $C_{20}$ at 20° C. to the negative electrode capacity $C_{60}$ at 60° C. to fall within a range of between 98% and 80%. It is more desirable for the particular ratio to fall within a range of between 98% and 90%, and is most desirable for the particular ratio to fall within a range of between 95% and 92%. Incidentally, the time of starting the use of the secondary battery represents the time when the secondary battery delivered to the user is charged or discharged for the first time by the user.

It is desirable for the discharge capacity $C_{60}$ at 60° C. to be not larger than 98% of the discharge capacity $C_{85}$ at 85° C. in which the negative electrode is charged to 0.01V versus Li with a current of 0.2 C at 85° C., followed by discharging the negative electrode to 1.5V versus Li with a current of 0.2 C at 85° C. If a ratio of the discharge capacity $C_{60}$ at 60° C. to the discharge capacity $C_{85}$ at 85° C. exceeds 98%, it is difficult to suppress sufficiently the progress of the self-discharge. On the other hand, if a ratio of the discharge capacity $C_{60}$ at 60° C. to the discharge capacity $C_{85}$ at 85° C. is smaller than 80%, it is difficult to obtain high charge-discharge characteristics at room temperature. It follows that it is desirable for a ratio of the discharge capacity $C_{60}$ at 60° C. to the discharge capacity $C_{85}$ at 85° C. to fall within a range of between 98% and 80%. It is more desirable for the particular ratio to fall within a range of between 98% and 90% and is most desirable for the particular ratio to fall within a range of between 98% and 95%.

It is desirable for each of the discharge capacity $C_{20}$ at 20° C., the discharge capacity $C_{60}$ at 60° C. and the discharge capacity $C_{85}$ at 85° C. to satisfy the conditions given below.

Specifically, it is desirable for the electrode capacity obtained when negative electrode C is charged to 0.01V versus Li with a current of 0.2 C at 20° C., followed by discharging negative electrode C to 1V versus Li with a current of 0.2 C at 20° C. not to have an error not smaller than 5% of the discharge capacity $C_{20}$ at 20° C. It is also desirable for the electrode capacity obtained when negative electrode C is charged to 0.01V versus Li with a current of 0.2 C at 60° C., followed by discharging negative electrode C to 1V versus Li with a current of 0.2 C at 60° C. to correspond to 92% to 98% of the discharge capacity $C_{60}$ at 60° C. Further, It is desirable for the electrode capacity obtained when negative electrode C is charged to 0.01V versus Li with a current of 0.2 C at 85° C., followed by discharging negative electrode C to 1V versus Li with a current of 0.2 C at 85° C. to correspond to 92% to 98% of the discharge capacity $C_{85}$ at 85° C.

Further, an electrode capacity is obtained when the negative electrode C is discharged to 1V versus Li, and it is desirable for the electrode capacity to increase in accordance with elevation of the charging temperature. Negative electrode C meeting the particular requirement permits markedly suppressing the self-discharge during storage of the secondary battery under high temperatures.

It is desirable for the specific surface area determined by a BET method of the carbonaceous material contained in negative electrode C to fall within a range of between 0.1 $m^2/g$ and 5 $m^2/g$. If the specific surface area is smaller than 0.1 $m^2/g$, the normal liberation-insertion reaction of lithium tends to be inhibited so as to impair the rate characteristics of the secondary battery. On the other hand, if the specific surface area exceeds 5 $m^2/g$, it is difficult to improve sufficiently the self-discharge characteristics of the secondary battery. It is more desirable for the specific surface area in question to fall within a range of between 0.1 $m^2/g$ and 3 $m^2/g$. Where a plurality of carbonaceous materials are contained in the negative electrode, it is possible for the carbonaceous materials to have the same specific surface areas or to have different specific surface areas as far as the specific surface area of each of the carbonaceous materials falls within a range of between 0.1 $m^2/g$ and 5 $m^2/g$.

It is also possible for the carbonaceous material to include a first carbonaceous material having a specific surface area, which is determined by a BET method, falling within a range of between 0.1 $m^2/g$ and 5 $m^2/g$ and a second carbonaceous material having a specific surface area, which is determined by a BET method, falling within a range of between 0.1 $m^2/g$ and 20 $m^2/g$. In order to satisfy simultaneously the self-discharge characteristics, the discharge capacity and the cycle life, it is desirable for the mixing ratio of the first carbonaceous material to fall within a range of between 50 and 95 parts by weight based on the total amount of the carbonaceous materials and for the mixing ratio of the second carbonaceous material to fall within a range of between 5 and 50 parts by weight based on the total amount of the carbonaceous materials.

Negative electrode C can be prepared by, for example, suspending and kneading a carbonaceous material and a binder in the presence of a solvent, followed by coating a current collector with the resultant suspension and subsequently drying the coating and pressing the coated current collector once or 2 to 5 times under a predetermined pressure. The carbonaceous material described previously in conjunction with negative electrode A, i.e., a mixture including 90 to 99 parts by weight of carbonaceous material A and 1 to 10 parts by weight of carbonaceous material B, can be used for preparing negative electrode C. Also, a composite material in which carbonaceous material A is covered with carbonaceous material B or a mixture including the particular composite material and the mixture noted above can be used as the carbonaceous material for preparing negative electrode C.

3-4) Negative Electrode D

In negative electrode D, the remaining lithium amount under the state that secondary battery is discharged under room temperature to 3V under the current of 0.2 C falls within a range of between 1.1% by weight and 2% by weight relative to 100% by weight of the carbonaceous material contained in negative electrode D.

If the remaining lithium amount is smaller than 1.1% by weight, it is difficult to suppress the self-discharge during storage of the secondary battery under high temperature environment. On the other hand, if the remaining lithium amount exceeds 2% by weight, the initial charging-discharging efficiency is lowered so as to make it difficult to ensure a sufficient capacity density per unit volume of the secondary battery. It is more desirable for the remaining lithium amount to fall within a range of between 1.1% by weight and 1.8% by weight.

It is desirable for the specific surface area determined by a BET method of the carbonaceous material to fall within a range of between 0.1 $m^2/g$ and 5 $m^2/g$. If the specific surface area is smaller than 0.1 $m^2/g$, the normal liberation-insertion reaction of lithium tends to be inhibited so as to impair the rate characteristics of the secondary battery. On the other hand, if the specific surface area exceeds 5 $m^2/g$, it is difficult to improve sufficiently the self-discharge characteristics of the secondary battery. It is more desirable for the specific surface area in question to fall within a range of between 0.1 $m^2/g$ and 3 $m^2/g$.

It is also possible for the carbonaceous material to include a first carbonaceous material having a specific surface area, which is determined by a BET method, falling within a range of between 0.1 $m^2/g$ and 5 $m^2/g$ and a second carbonaceous material having a specific surface area, which is determined by a BET method, falling within a range of between 0.1 $m^2/g$ and 20 $m^2/g$. In order to satisfy simultaneously the self-discharge characteristics, the discharge capacity and the cycle life, it is desirable for the mixing ratio of the first carbonaceous material to fall within a range of between 50 and 95 parts by weight based on the total amount of the carbonaceous materials and for the mixing ratio of the second carbonaceous material to fall within a range of between 5 and 50 parts by weight based on the total amount of the carbonaceous materials.

Negative electrode D can be prepared by, for example, suspending and kneading a carbonaceous material and a binder in the presence of a solvent, followed by coating a current collector with the resultant suspension and subsequently drying the coating and pressing the coated current collector once or 2 to 5 times under a predetermined pressure. The carbonaceous material described previously in conjunction with negative electrode A, i.e., a mixture including 90 to 99 parts by weight of carbonaceous material A and 1 to 10 parts by weight of carbonaceous material B, can be used for preparing negative electrode D. Also, a composite material in which carbonaceous material A is covered with carbonaceous material B or a mixture including the particular composite material and the mixture noted above can be used as the carbonaceous material for preparing negative electrode D. The remaining lithium amount can be controlled by controlling, for example, the mixing ratio of carbonaceous material B.

3-5) Negative Electrode E

Lithium absorbed in the carbonaceous material of negative electrode E under the state that the secondary battery is discharged to 3V under a current of 0.2 C at room temperature exhibits a half-width of the main peak being 70 ppm (or 10,000 Hz in terms of the absolute value) or less in the solid state $^7$Li-NMR spectrum measured by a magic angle spinning method (MAS method).

In the solid state $^7$Li-NMR, two peaks are detected. The main peak denotes the peak having a smaller half-width. The peak having a larger half-width is called a subsidiary peak. The main-peak waveform and the subsidiary peak waveform may partly overlap or may completely overlap. The shift value of the main peak and that of the subsidiary peak may be the same or different.

By setting the half-width of the main peak at 70 ppm (10,000 Hz) or less, it is possible to increase the ratio of lithium having a high ionicity in the lithium absorbed in the negative electrode under the state that the secondary battery is charged to 3V at room temperature under a current of 0.2 C so as to make it possible to suppress elevation of the negative electrode voltage during storage of the secondary battery under a high temperature environment and during storage of the secondary battery for a long time. It is more desirable for the half-width to be not larger than 50 ppm and, furthermore desirably, to be not larger than 30 ppm. On the other hand, it is desirable to set the lower limit of the half-width at 1 ppm.

In the solid state $^7$Li-NMR, it is desirable for the main peak to be detected in the shift value of −5 to 20 ppm. It should be noted that, in the solid state $^7$Li-NMR, the peak detected in the shift value of −5 to 20 ppm is derived from lithium bonded to the carbon atom in the carbonaceous material by a bond close to an ionic bond. On the other hand, the peak detected in a region in which the shift value is larger than 20 ppm is derived from a semimetallic lithium excellent in the electron conductivity with the carbon atom of the carbonaceous material. If the peak detected in the shift value of −5 to 20 ppm is the main peak, it is possible to obtain the effect of the present invention more prominently. It is more desirable for the shift value at which the main peak is detected to fall within a range of between −3 ppm and 10 ppm.

It is desirable for a ratio of $S_1$ to $(S_1+S_2)$, where $S_1$ represents the peak area of the main peak and $S_2$ represents the peak area of the subsidiary peak, to fall within a range of between 5% and 75%. The subsidiary peak is derived from the semimetallic lithium excellent in the electron conductivity with the carbon atom of the carbonaceous material. If the peak area ratio of the main peak $S_1$ is less than 5%, it is difficult to improve the self-discharge characteristics of the secondary battery. On the other hand, if the peak area ratio of the main peak $S_1$ exceeds 75%, the discharge capacity and the cycle life of the secondary battery tend to be lowered. It is more desirable for the peak area ratio of the main peak $S_1$ to fall within a range of between 5% and 60% and, furthermore desirably between 5% and 50%.

It is desirable for the specific surface area determined by a BET method of the carbonaceous material to fall within a range of between 0.1 $m^2/g$ and 5 $m^2/g$. If the specific surface area is smaller than 0.1 $m^2/g$, the normal liberation-insertion reaction of lithium tends to be inhibited so as to impair the rate characteristics of the secondary battery. On the other hand, if the specific surface area exceeds 5 $m^2/g$, it is difficult to improve sufficiently the self-discharge characteristics of the secondary battery. It is more desirable for the specific surface area in question to fall within a range of between 0.1 m$^2$/g and 3 m$^2$/g.

It is also possible for the carbonaceous material to include a first carbonaceous material having a specific surface area, which is determined by a BET method, falling within a range of between 0.1 m$^2$/g and 5 m$^2$/g and a second carbonaceous material having a specific surface area, which is determined by a BET method, falling within a range of between 0.1 m$^2$/g and 20 m$^2$/g. In order to satisfy simultaneously the self-discharge characteristics, the discharge capacity and the cycle life, it is desirable for the mixing ratio of the first carbonaceous material to fall within a range of between 50 and 95 parts by weight based on the total amount of the carbonaceous materials and for the mixing ratio of the second carbonaceous material to fall within a range of between 5 and 50 parts by weight based on the total amount of the carbonaceous materials.

Negative electrode E can be prepared by, for example, suspending and kneading a carbonaceous material and a binder in the presence of a solvent, followed by coating a current collector with the resultant suspension and subsequently drying the coating and pressing the coated current collector once or 2 to 5 times under a predetermined pressure. The carbonaceous material described previously in conjunction with negative electrode A, i.e., a mixture including 90 to 99 parts by weight of carbonaceous material A and 1 to 10 parts by weight of carbonaceous material B, can be used for preparing negative electrode E. Also, a composite material in which carbonaceous material A is covered with carbonaceous material B or a mixture including the particular composite material and the mixture noted above can be used as the carbonaceous material for preparing negative electrode E. Incidentally, the peak area ratio of the main peak $S_1$ can be controlled by, for example, changing the mixing ratio of carbonaceous material B relative to the total amount of the carbonaceous materials.

4) Separator

The separator comprises a porous sheet.

It is possible to use, for example, a porous film or an unwoven fabric as the porous sheet. It is desirable for the porous sheet to be made of at least one kind of material selected from the group consisting of polyolefin and cellulose. The polyolefin used in the present invention includes, for example, polyethylene and polypropylene. Particularly, it is desirable to use a porous film made of polyethylene, polypropylene or both polyethylene and polypropylene because the particular porous film permits improving the safety of the secondary battery.

Also, it is possible for the separator to further contain a polymer having an adhesivity.

5) Liquid Nonaqueous Electrolyte

The liquid nonaqueous electrolyte used in the present invention comprises a nonaqueous solvent including γ-butyrolactone (GBL) and a solute dissolved in the nonaqueous solvent. It is desirable for the nonaqueous solvent to include GBL and another nonaqueous solvent such as a cyclic carbonate.

It is desirable for GBL to be contained in an amount falling within a range of between 20% by volume and 80% by volume based on the entire nonaqueous solvent. If the GBL content is lower than 20% by volume, it is difficult to suppress sufficiently the gas generation caused by the decomposition by oxidation of the liquid nonaqueous electrolyte during storage of the secondary battery under high temperatures. Also, since the amount of a cyclic carbonate, which is a nonaqueous solvent used together with GBL, is rendered relatively large, the viscosity of the nonaqueous solvent is increased. If the viscosity of the solvent is increased, the conductivity of the nonaqueous electrolyte is lowered. In addition, the permeability of the nonaqueous electrolyte into the electrode group is lowered. It follows that the charge-discharge cycle characteristics of the secondary battery tend to be lowered. On the other hand, if the amount of GBL exceeds 80% by volume of the entire nonaqueous solvent, GBL tends to react easily with the negative electrode, with the result that it is difficult to obtain excellent charge-discharge cycle characteristics. To be more specific, if the negative electrode, which contains a carbonaceous material capable of absorbing-desorbing lithium ions, reacts with GBL so as to decompose the liquid nonaqueous electrolyte by reduction, a film inhibiting the charge-discharge reaction is formed on the surface of the negative electrode. As a result, a current concentration tends to take place on the negative electrode so as to cause difficulties. For example, the lithium metal is precipitated on the surface of the negative electrode. Alternatively, the impedance is increased in the negative electrode interface. It follows that the charge-discharge efficiency on the negative electrode is lowered and, thus, the charge-discharge cycle characteristics are lowered. It is more desirable for the GBL content of the nonaqueous solvent to fall within a range of between 40% by volume and 75% by volume.

It is desirable for the cyclic carbonate, which is a nonaqueous solvent mixed with GBL, to be at least one compound selected from the group consisting of propylene carbonate (PC), ethylene carbonate (EC), vinylene carbonate (VC) and trifluoropropylene carbonate (TFPC). Particularly, if EC is used as a nonaqueous solvent mixed with GBL, it is possible to markedly improve the charge-discharge cycle characteristics and the large current discharge characteristics. It is desirable for the EC content of the entire nonaqueous solvent to fall within a range of not less than 5% by volume and less than 40% by volume. If the EC content is lower than 5% by volume, it is difficult for the surface of the negative electrode to be covered densely with a protective film. As a result, the reaction between the negative electrode and GBL proceeds so as to make it difficult to improve sufficiently the charge-discharge cycle characteristics. On the other hand, if the EC content of the nonaqueous solvent is 40% by volume or more, the viscosity of the liquid nonaqueous electrolyte tends to be increased so as to make it difficult to improve sufficiently the charge-discharge cycle characteristics. It is more desirable for the EC content of the nonaqueous solvent to fall within a range of between 10% by volume and 35% by volume.

It is also possible for the nonaqueous solvent to further contain a solvent having a low viscosity in an amount not larger than 20% by volume in order to lower the viscosity of the nonaqueous solvent. The solvent having a low viscosity, which is used in the present invention, includes, for example, a chain-like carbonate, a chain-like ether and a cyclic ether.

It is desirable for the nonaqueous solvent used in the present invention to be a mixed solvent including GBL, EC and at least one third solvent selected from the group consisting of PC, VC, TFPC, diethyl carbonate (DEC), methyl ethyl carbonate (MEC), and an aromatic compound. Such a mixed solvent permits further improving the charge-discharge cycle characteristics. Also, it is desirable for at least one kind of solvent selected from the group consisting of DEC, MEC and VC to be contained in an amount falling within a range of between 0.01% by volume and 10% by volume based on the entire nonaqueous solvent.

Desired compositions of the nonaqueous solvents include, for example, a combination of GBL and EC, a combination of GBL and PC, a combination of GBL, EC and DEC, a combination of GBL, EC and MEC, a combination of GBL, EC, MEC and VC, a combination of GBL, EC and VC, a combination of GBL, PC and VC, and a combination of GBL, EC, PC and VC.

The solutes dissolved in the nonaqueous solvent include lithium salts including, for example, lithium perchlorate ($LiClO_4$), lithium hexafluoro phosphate ($LiPF_6$), lithium tetrafluoro borate ($LiBF_4$), lithium hexafluoro arsenate ($LiAsF_6$), lithium trifluoro meta-sulfonate ($LiCF_3SO_3$), and bis-trifluoromethyl sulfonyl imitolithium [$LiN(CF_3SO_2)_2$]. Particularly, it is desirable to use $LiBF_4$ as the solute dissolved in the nonaqueous solvent.

It is desirable for the concentration of the solute in the nonaqueous solvent to fall within a range of between 1 mol/L and 3 mol/L, more desirably between 1.6 mol/L and 3 mol/L, furthermore desirably between 1.8 mol/L and 2.5 mol/L, and most desirably between 2 mol/L and 2.2 mol/L.

In order to improve the wettability with the separator, it is desirable to add a surfactant such as trioctyl phosphate in an amount of 0.01 to 3%.

It is desirable for the liquid nonaqueous electrolyte to be contained in an amount of 0.2 to 0.6 g per 100 mAh of the battery unit capacity, desirably in an amount of 0.4 to 0.55 g/100 mAh.

6) Case

The thickness of the sheet material forming the case is not larger than 0.3 mm. The sheet material used in the present invention includes, for example, a sheet including a resin layer, a metal plate or a metal film. The wall thickness of the case denotes the thickness of the sheet material.

The resin layer included in the sheet is formed of, for example, polyethylene or polypropylene. It is desirable for the sheet to include a metal layer and protective layers formed on both surfaces of the metal layer. The metal layer plays the role of shielding water and is formed of, for example, aluminum, stainless steel, iron, copper or nickel. Particularly, it is desirable for the metal layer to be formed of aluminum because aluminum is lightweight and permits effectively shielding water. It is possible for the metal layer to be formed of a single kind of metal. Alternatively, a plurality of different kinds of metal layers may be made integral so as to provide the metal layer included in the case. One of the two protective layers which is in contact with the outside, i.e., the external protective layer, plays the role of preventing damage done to the metal layer. The external protective layer is formed of a single kind of resin layer or a plurality of resin layers. On the other hand, the internal protective layer plays the role of preventing the metal layer from being corroded by the nonaqueous electrolyte. The internal protective layer is formed of a single kind of resin layer or a plurality of resin layers. It is possible to arrange a thermoplastic resin on the surface of the internal protective layer.

It is possible for the metal plate and the metal film to be formed of, for example, iron, stainless steel, or aluminum.

As described above, the wall thickness of the case is not larger than 0.3 mm. If the wall thickness is larger than 0.3 mm, it is difficult to obtain a high weight energy density and a high volume energy density. It is more desirable for the wall thickness of the case to be not larger than 0.25 mm, furthermore desirably to be not larger than 0.15 mm, and most desirably to be not larger than 0.12 mm. If the wall thickness of the case is smaller than 0.05 mm, however, the case tends to be deformed and broken. Naturally, it is desirable for the lower limit in the wall thickness of the case to be 0.05 mm.

The wall thickness of the case is measured as follows. Specifically, three points apart from each other by at least 1 cm are optionally selected in regions of the case except the sealing portion, e.g., the heat seal portion. The thickness in each of these three points is measured, and the average value of the thickness in these three points is defined as the wall thickness of the case. Incidentally, where a foreign matter such as resin is attached to the surface of the case, the thickness is measured after removal of the foreign matter. For example, where PVdF is attached to the surface of the case, the surface of the case is wiped with a dimethyl formamide solution so as to remove PVdF, followed by measuring the thickness.

A second nonaqueous electrolyte secondary battery will now be described.

The second nonaqueous electrolyte secondary battery comprises a case substantially formed of a sheet material having a thickness not larger than 0.3 mm and an electrode group housed in the case. The electrode group comprises a positive electrode, any of negative electrodes A to E described previously, and a gel-like nonaqueous electrolyte layer arranged between the positive electrode and the negative electrode and including a nonaqueous solvent including γ-butyrolactone, a solute dissolved in the nonaqueous solvent, and a polymer.

It is possible to use the positive electrode, the negative electrode, the nonaqueous solvent and the solute equal to those described previously in conjunction with the first nonaqueous electrolyte secondary battery.

It is possible to improve at least one of the self-discharge characteristics, the discharge capacity and the charge-discharge cycle life by using a carbonaceous material exhibiting the features of at least two carbonaceous materials contained in negative electrodes A to E described previously.

The nonaqueous electrolyte layer can be prepared, for example, as follows. In the first step, a paste prepared by mixing a polymer, a nonaqueous solvent and a solute is formed into a film of a gel-like nonaqueous electrolyte precursor, followed by drying the resultant film. Then, the film of the gel-like nonaqueous electrolyte precursor is arranged between the positive electrode and the negative electrode so as to prepare an electrode group. The electrode group thus obtained is impregnated with a liquid nonaqueous electrolyte comprising a nonaqueous solvent and a solute, followed by plasticizing the precursor under a reduced pressure so as to obtain the gel-like nonaqueous electrolyte layer.

It is desirable for the polymer contained in the paste noted above to exhibit thermoplastic properties. It is possible to use as the polymer meeting this requirement at least one of the polymers selected from the group consisting of, for example, polyvinylidene fluoride (PVdF), polyacrylonitrile (PAN), polyethylene oxide (PEO), polyvinyl chloride (PVC), polyacrylate (PMMA), and polyvinylidene fluoride-hexafluoro propylene (PVdF-HFP).

A thin type lithium ion secondary battery as an example of the nonaqueous electrolyte secondary battery of the present invention will now be described in detail with reference to FIGS. 1 and 2.

Figure 2:
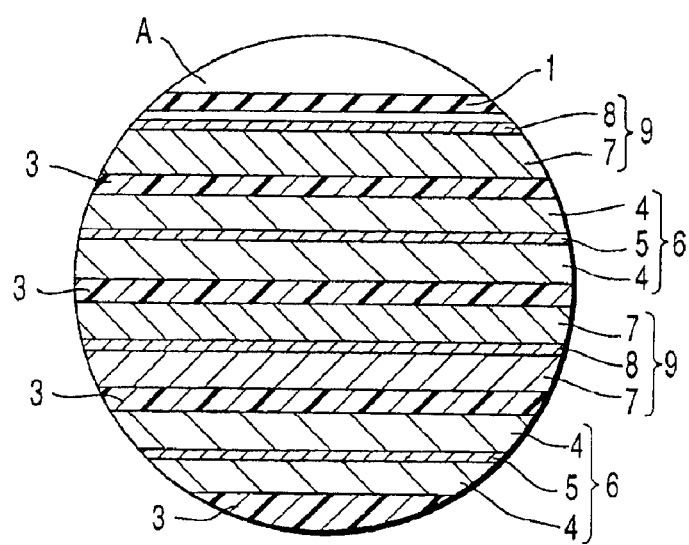
FIG. 2 is a cross sectional view showing in a magnified fashion part A shown in FIG. 1.

FIG. 1 is a cross sectional view showing the construction of a thin type lithium ion secondary battery as an example of the nonaqueous electrolyte secondary battery of the present invention, and FIG. 2 is a cross sectional view showing in a magnified fashion part A shown in FIG. 1.

As shown in FIG. 1, an electrode group 2 is housed in a case 1 having a wall thickness X not larger than 0.3 mm. The electrode group 2 is prepared by winding in a flat shape a laminate structure comprising a positive electrode, a separator and a negative electrode. As shown in FIG. 2, the laminate structure includes a separator 3, a positive electrode 6 comprising a positive electrode layer 4, a positive electrode current collector 5 and a positive electrode layer 4, a separator 3, a negative electrode 9 comprising a negative electrode layer 7, a negative electrode current collector 8 and a negative electrode layer 7, a separator 3, a positive electrode 6 comprising a positive electrode layer 4, a positive electrode current collector 5 and a positive electrode layer 4, a separator 3, and a negative electrode 9 comprising a negative electrode layer 7 and a negative electrode current collector 8, which are laminated in the order mentioned as viewed from the lower side in the drawing. The outermost layer of the electrode group 2 is the negative electrode current collector 8. A band-like positive electrode lead 10 is connected at one end to the positive electrode current collector 5 of the electrode group 2, with the other end portion of the positive electrode lead 10 extending to the outside of the case 1. On the other hand, a band-like negative electrode lead 11 is connected at one end to the negative electrode current collector 8 of the electrode group 2, with the other end portion of the negative electrode lead 11 extending to the outside of the case 1.

In the embodiment shown in FIGS. 1 and 2, used is an electrode group prepared by winding in a flat shape a laminate structure including a positive electrode, a separator and a negative electrode. Alternatively, it is also possible to use an electrode group substantially formed of a laminate structure including a positive electrode, a negative electrode and a separator arranged between the positive and negative electrodes or an electrode group prepared by folding at least once a laminate structure including a positive electrode, a negative electrode and a separator arranged between the positive and negative electrodes.

The first embodiment of the nonaqueous electrolyte secondary battery of the present invention described above comprises a case whose wall thickness being not larger than 0.3 mm, a positive electrode housed in the case, a negative electrode housed in the case and containing a carbonaceous material capable of absorbing-desorbing lithium ions, and a nonaqueous electrolyte housed in the case and comprising a nonaqueous solvent including γ-butyrolactone (GBL) and a solute dissolved in the nonaqueous solvent. The carbonaceous material contains at least 90 parts by weight of carbonaceous material A having not larger than 0.337 nm of the average layer spacing $d_{002}$ derived from (002) reflection, which is obtained by a powder X-ray diffraction, and 1 to 10 parts by weight of carbonaceous material B having 0.36 to 0.4 nm of the average layer spacing $d_{002}$ derived from (002) reflection, which is obtained by a powder X-ray diffraction.

According to the secondary battery of the particular construction, it is possible to suppress the self-discharge during storage of the secondary battery under a high temperature. The particular effect of the present invention is considered to be derived from the mechanism described below.

Specifically, GBL is slightly reactive with a negative electrode having a noble potential. The reaction can be suppressed by SEI (solid electrolyte interphase) present on the surface of the negative electrode. However, where the reaction noted above is activated by some conditions during storage of the secondary battery under a high temperature, it is possible for the reaction to cause the self-discharge. The reaction rate of carbonaceous material B with GBL is lower than that of carbonaceous material A with GBL. In addition, the charge-discharge capacity of carbonaceous material B under high temperature is higher than that of carbonaceous material A. It follows that it is possible to avoid elevation of the negative electrode potential during storage of the secondary battery under a high temperature in a discharged state by mixing carbonaceous material B with carbonaceous material A in a predetermined mixing ratio. As a result, it is possible to suppress the progress of the self-discharge during storage of the secondary battery under a high temperature. For example, it is possible to suppress the voltage reduction caused by the self-discharge in the case where the secondary battery is discharged to 3V with a current of 0.2 C under room temperature and stored under this condition at 60° C. in 3 weeks to a level 1.5V or less (preferably 1V or less) so as to make it possible to avoid the damage done to the nonaqueous electrolyte and to the positive and negative electrodes. It follows that it is possible to ensure a reliability of the secondary battery over a long period of time.

As described above, the first embodiment of the present invention provides a nonaqueous electrolyte secondary battery having a long life and a high energy density, which permits suppressing the swelling of the case and the self-discharge during storage of the secondary battery under a high temperature.

In the first embodiment of the nonaqueous electrolyte secondary battery of the present invention, each of carbonaceous material A and carbonaceous material B comprises a fibrous material having an aspect ratio not smaller than 0.1 and smaller than 4, making it possible to suppress the nonuniform reaction on the negative electrode caused by the mixing of carbonaceous materials differing from each other in properties. It follows that it is possible to improve the charge-discharge cycle life.

According to the second embodiment of the nonaqueous electrolyte secondary battery of the present invention, the carbonaceous material comprises at least 90 parts by weight of a carbonaceous material obtained by subjecting a carbonaceous material precursor to a heat treatment at 2500° C. or more and 1 to 10 parts by weight of another carbonaceous material obtained by subjecting a carbonaceous material precursor to a heat treatment at 900° C. or less. The particular construction of the carbonaceous material makes it possible to avoid the elevation of the negative electrode potential during storage of the secondary battery of a discharged state under high temperatures. As a result, it is possible suppress the progress of the self-discharge during storage of the secondary battery under high temperatures. For example, it is possible to suppress the voltage reduction caused by the self-discharge in the case where the secondary battery is discharged to 3V with a current of 0.2 C under room temperature and stored under this condition at 60° C. in 3 weeks to a level 1.5V or less (preferably 1V or less). Therefore, it is possible to avoid the damage done to the nonaqueous electrolyte and the positive and negative electrodes so as to ensure a reliability of the secondary battery over a long period of time. As described above, the second embodiment of the present invention provides a nonaqueous electrolyte secondary battery having a long life and a high energy density, which permits suppressing the swelling of the case and the self-discharge during storage of the secondary battery under a high temperature.

In the second embodiment of the nonaqueous electrolyte secondary battery of the present invention, each of the two kinds of carbonaceous materials comprises a fibrous material having an aspect ratio not smaller than 0.1 and smaller than 4, making it possible to suppress the nonuniform reaction on the negative electrode caused by the mixing of carbonaceous materials differing from each other in properties. It follows that it is possible to improve the charge-discharge cycle life.

According to a third embodiment of the nonaqueous electrolyte secondary battery of the present invention, the shift value of the peak derived from lithium inserted into the carbonaceous material of the negative electrode under the state that the secondary battery is fully charged to 4.2V is detected in −1 to 20 ppm and 40 to 50 ppm in the solid state $^7$Li-NMR spectrum measured by a magic angle spinning method (MAS method).

In the secondary battery of the particular construction, it is possible to avoid the elevation of the negative electrode potential during storage of the secondary battery of a discharged state under high temperatures. As a result, it is possible suppress the progress of the self-discharge during storage of the secondary battery under high temperatures. For example, it is possible to suppress the voltage reduction caused by the self-discharge in the case where the secondary battery is discharged to 3V with a current of 0.2 C under room temperature and stored under this condition at 60° C. for 3 weeks to 1.5V or less (preferably 1V or less). Therefore, it is possible to avoid the damage done to the nonaqueous electrolyte and the positive and negative electrodes so as to ensure a reliability of the secondary battery over a long period of time. As described above, the third embodiment of the present invention provides a nonaqueous electrolyte secondary battery having a long life and a high energy density, which permits suppressing the swelling of the case and the self-discharge during storage of the secondary battery under a high temperature.

Also, in the third embodiment of the nonaqueous electrolyte secondary battery of the present invention, an integrated intensity ratio $I_A/I_B$, in which $I_A$ represents the integrated intensity of the peak detected in the shift value of −1 to 20 ppm, and $I_B$ represents the integrated intensity of the peak detected in the shift value of 40 to 50 ppm, is set to fall within a range of between 0.08 and 0.4 so as to improve both the charge-discharge cycle characteristics and the self-discharge characteristics during storage of the secondary battery under high temperatures. In the secondary battery of the particular construction, lithium absorbed in the carbonaceous material of the negative electrode under the state that the secondary battery is discharged to 3V under a current of 0.2 C at room temperature exhibits a half-width of the main peak of 70 ppm (10,000 Hz) or less in the solid state $^7$Li-NMR spectrum measured by a magic angle spinning method (MAS method), with the result that it is possible to further improve both the charge-discharge characteristics and the self-discharge characteristics during storage of the secondary battery under high temperatures.

In the third embodiment of the nonaqueous electrolyte secondary battery of the present invention, the carbonaceous material comprises a fiber having an aspect ratio not smaller than 0.1 and smaller than 4 so as to make it possible to further improve the charge-discharge cycle life of the secondary battery.

The fourth embodiment of the nonaqueous electrolyte secondary battery of the present invention comprises a negative electrode satisfying formula (1) given below:

$$C_{20} \leq 0.98 \times C_{60} \quad (1)$$

where $C_{20}$ represents a negative electrode capacity obtained when the negative electrode of the secondary battery at the time of starting its use is charged to 0.01V versus Li with a current of 0.2 C at 20° C., followed by discharging the negative electrode to 1.5V versus Li with a current of 0.2 C at 20° C., and $C_{60}$ represents a negative electrode capacity obtained when the negative electrode of the secondary battery at the time of starting its use is charged to 0.01V versus Li with a current of 0.2 C at 60° C., followed by discharging the negative electrode to 1.5V versus Li with a current of 0.2 C at 60° C.

In the negative electrode of the particular construction, the charge-discharge capacity is increased with elevation of temperature. The secondary battery equipped with the particular negative electrode is capable of avoiding the elevation of the negative electrode potential during storage of the secondary battery of the discharged state under high temperatures, making it possible to suppress the progress of the self-discharge during storage of the secondary battery under high temperatures. For example, it is possible to suppress the voltage reduction caused by the self-discharge in the case where the secondary battery is discharged to 3V with a current of 0.2 C under room temperature and stored under this condition at 60° C. for 3 weeks to 1.5V or less (preferably 1V or less). Therefore, it is possible to avoid the damage done to the nonaqueous electrolyte and the positive and negative electrodes so as to ensure a reliability of the secondary battery over a long period of time.

As described above, the fourth embodiment of the present invention provides a nonaqueous electrolyte secondary battery having a long life and a high energy density, which permits suppressing the swelling of the case and the self-discharge during storage of the secondary battery under a high temperature.

In the fourth embodiment of the nonaqueous electrolyte secondary battery of the present invention, it is desirable for the negative electrode capacity $C_{60}$ at 60° C. to satisfy formula (3) given below:

$$C_{60} \leq 0.98 \times C_{85} \quad (3)$$

where $C_{85}$ represents a negative electrode capacity obtained when the negative electrode of the secondary battery at the time of starting its use is charged to 0.01V versus Li with a current of 0.2 C at 85° C., followed by discharging the negative electrode to 1.5V versus Li with a current of 0.2 C at 85° C.

In the particular construction of the present invention, it is possible to increase the charge-discharge capacity of the negative electrode with elevation of temperature, with the result that it is possible to further retard the progress of the self-discharge during storage of the secondary battery of the discharged state under high temperatures.

According to the fifth embodiment of the nonaqueous electrolyte secondary battery of the present invention, the remaining lithium amount under the state that the battery is discharged to 3V with the current of 0.2 C at room temperature falls within a range of between 1.1% by weight and 2% by weight relative to the amount of the carbonaceous material. As a result, it is possible to suppress the self-discharge during storage of the secondary battery under high temperatures without impairing the cycle life characteristics and the charge-discharge characteristics such as the discharge capacity while suppressing the swelling of the case during storage of the secondary battery under high temperatures. The particular effect of the present invention is considered to be produced by the mechanism described below.

Specifically, where an SEI (solid electrolytes interphase) protecting the surface of the negative electrode is broken, lithium intercalated in the carbonaceous material is brought into contact with the nonaqueous electrolyte containing γ-butyrolactone, with the result that lithium is withdrawn from the carbonaceous material by the nonaqueous electrolyte so as to bring about the self-discharge of the nonaqueous electrolyte secondary battery. It is considered that $LiBF_4$ may promote this reaction. If the self-discharge proceeds, it is possible for the battery capacity to be lowered in the re-charged time after the self-discharge.

In the present invention, however, the remaining lithium amount under the state that the battery is discharged to 3V with the current of 0.2 C at room temperature is set to fall within a range of between 1.1% by weight and 2% by weight relative to the amount of the carbonaceous material so as to make it possible to render the remaining lithium amount in the negative electrode of the discharged state excessively large. If the secondary battery of the present invention is stored under a high temperature environment, the lithium withdrawing reaction certainly takes place. However, since the remaining lithium amount in the negative electrode is originally large, the lithium amount is prevented from becoming markedly small. As a result, it is possible to suppress the elevation of the negative electrode voltage so as to retard the progress of the self-discharge. For example, it is possible to suppress the voltage reduction caused by the self-discharge in the case where the secondary battery is discharged to 3V with a current of 0.2 C under room temperature and stored under this condition at 60° C. for 3 weeks to 1.5V or less (preferably 1V or less). Therefore, it is possible to prevent an irreversible reaction such as the dissolution of the negative electrode current collector during storage of the secondary battery under a high temperature environment so as to ensure a reliability of the secondary battery over a long time.

In the fifth embodiment of the nonaqueous electrolyte secondary battery of the present invention, it is desirable for the specific surface area of the carbonaceous material of the negative electrode to fall within a range of between 0.1 m$^2$/g and 5 m$^2$/g. If the specific surface area of the carbonaceous material is larger than 5 m$^2$/g, the progress of the lithium withdrawing reaction is certainly promoted. However, even in the case of using a negative electrode having a large remaining lithium amount in the discharged state as in the present invention, it is possible for the negative electrode voltage to be elevated in a short time so as to promote the progress of the self-discharge. On the other hand, if the specific surface area of the carbonaceous material is smaller than 0.1 m$^2$/g, it is possible for the normal lithium liberation-insertion reaction differing from the lithium withdrawing reaction to be inhibited so as to lower the rate characteristics of the secondary battery. Where the specific surface area of the carbonaceous material falls within a range of between 0.1 m$^2$/g and 5 m$^2$/g as specified in the present invention, it is possible to further retard the progress of the self-discharge without impairing the charged-discharge characteristics such as the rate characteristics.

According to the sixth embodiment of the nonaqueous electrolyte secondary battery of the present invention, lithium absorbed in the carbonaceous material of negative electrode under the state that the secondary battery is discharged to 3V under a current of 0.2 C at room temperature exhibits a half-width of the main peak of 70 ppm or less (10,000 Hz) in the solid state $^7$Li-NMR spectrum measured by a magic angle spinning method (MAS method). As a result, it is possible to suppress the self-discharge during storage of the secondary battery under a high temperature environment and during storage of the secondary battery for a long time without impairing the cycle life characteristics and the charge-discharge characteristics such as the discharge capacity while suppressing the swelling of the case during storage of the secondary battery under high temperatures. The particular effect of the present invention is considered to be produced by the mechanism described below.

Specifically, in the sixth embodiment of the nonaqueous electrolyte secondary battery of the present invention, many of the lithium atoms remaining in the negative electrode of the secondary battery in the discharged state to 3V under a current of 0.2 C at room temperature are lithium atoms having a high ionicity. The reactivity of the lithium atom having a high ionicity with a nonaqueous electrolyte, particularly, a nonaqueous electrolyte containing γ-butyrolactone, is lower than that of the submetallic lithium atom. Therefore, where the secondary battery is stored under a high temperature environment or stored for a long time, lithium is unlikely to be withdrawn from the negative electrode by the nonaqueous electrolyte containing γ-butyrolactone so as to retard the rate of decrease in the remaining amount of lithium in the negative electrode and, thus, to suppress the elevation in the negative electrode voltage. As a result, it is possible to retard the progress of the self-discharge. For example, it is possible to suppress the voltage reduction caused by the self-discharge in the case where the secondary battery is discharged to 3V with a current of 0.2 C under room temperature and stored under this condition at 60° C. for 3 weeks to 1.5V or less (preferably 1V or less). Therefore, it is possible to prevent an irreversible reaction such as the dissolution of the negative electrode current collector during storage of the secondary battery under a high temperature environment so as to ensure a reliability of the secondary battery over a long time.

In the sixth embodiment of the nonaqueous electrolyte secondary battery of the present invention, the specific surface area of the carbonaceous material of the negative electrode is set to fall within a range of between 0.1 m$^2$/g and 5 m$^2$/g so as to make it possible to further retard the progress of the self-discharge without impairing the charge-discharge characteristics such as the rate characteristics.

Further, in the sixth embodiment of the nonaqueous electrolyte secondary battery of the present invention, a subsidiary peak is detected in the solid state 7Li-NMR Spectrum. It should be noted that a ratio of the peak area of the main peak to the sum of the peak area of the main peak and the peak area of the subsidiary peak is defined to fall within a range of between 5% and 75%. The particular construction permits further improving the discharge capacity and the charge-discharge cycle life of the secondary battery.

Examples of the present invention will now be described with reference to the accompanying drawings.

EXAMPLE 1

<Preparation of Positive Electrode>

A slurry was prepared by adding a solvent of N-methyl-2-pyrrolidone (NMP) to a mixture consisting essentially of 91% by weight of a powdery lithium cobalt oxide ($Li_xCoO_2$, where $0<x\leq1$), 3% by weight of acetylene black, 3% by weight of graphite, and 3% by weight of polyvinylidene fluoride (PVdF) used as a binder. The both surfaces of a current collector formed of an aluminum foil having a thickness of 15 μm were coated with the resultant slurry thus prepared, followed by drying and pressing the current collector coated with the slurry so as to prepare a positive electrode having an electrode density of 3 g/cm$^3$.

<Preparation of Negative Electrode>

Prepared as carbonaceous material A was a mesophase pitch based carbon fiber subjected to a heat treatment at 3,000° C. The carbon fiber had a fiber diameter of 8 μm, an average fiber length of 20 μm, an aspect ratio of 0.4, an average layer spacing $d_{002}$ derived from (002) reflection, which is obtained by a powder X-ray diffraction, of 0.3360 nm, and a specific surface area determined by a BET method of 1 $m^2$/g. Also prepared as carbonaceous material B was a mesophase pitch based carbon fiber subjected to a heat treatment at 800° C. The carbon fiber had a fiber diameter of 8 μm, an average fiber length of 20 μm, an aspect ratio of 0.4, an average layer spacing $d_{002}$ derived from (002) reflection, which is obtained by a powder X-ray diffraction, of 0.360 nm, and a specific surface area determined by a BET method of 2.5 $m^2$/g. 89% by weight (95 parts by weight) of carbonaceous material A was mixed with 4% by weight (5 parts by weight) of carbonaceous material B. Then, a slurry was prepared by adding 7% by weight of polyvinylidene fluoride (PVdF) used as a binder and N-methyl-2-pyrrolidone (NMP) used as a solvent to the mixture of carbonaceous materials A and B. Further, both surfaces of a current collector formed of a copper foil having a thickness of 12 μm were coated with the resultant slurry, followed by drying and pressing the current collector coated with the slurry so as to prepare a negative electrode having an electrode density of 1.35 g/cm$^3$.

The specific surface area of the carbonaceous material determined by the BET method was measured by single point BET method using a mixed gas of He—$N_2$ (70:30) as a carrier gas. Also, the average layer spacing $d_{002}$ derived from (002) reflection of each of carbonaceous materials A and B was obtained by FWHM (full width at half-maximum) middle point method from the powder X-ray diffraction spectrum. In this case, correction of the scattering such as the Lorentz scattering was not performed.

<Separator>

Prepared was a separator formed of a polyethylene porous film having a thickness of 25 μm, a thermal shrinkage of 20% under 120° C. for 1 hour, and a porosity of 50%.

<Preparation of Nonaqueous Electrolyte>

In the first step, ethylene carbonate (EC) and γ-butyrolactone (GBL) were mixed in a volume ratio of 1:2 so as to prepare a mixed solvent. Then, a nonaqueous electrolyte was prepared by dissolving lithium tetrafluoro borate ($LiBF_4$) in the resultant mixed solvent in a concentration of 1.5 mol/L.

<Preparation of Electrode Group>

A band-like positive electrode lead was welded to the current collector of the positive electrode, and a band-like negative electrode lead was welded to the current collector of the negative electrode. Under this condition, the positive electrode and the negative electrode were wound in a flat shape with the separator interposed between the positive and negative electrodes so as to prepare an electrode group.

The electrode group thus prepared was subjected to a press molding for 25 seconds under a pressure of 13 kg/cm$^2$ while heating the electrode group to 90° C. so as to allow the positive electrode, the negative electrode and the separator to be made integral.

On the other hand, a laminate film having a thickness of 0.1 mm, in which both surfaces of an aluminum foil were covered with polypropylene, was formed into a bag and the electrode group was housed in the bag.

Then, a vacuum drying was applied to the electrode group housed in the laminate bag so as to remove water contained in the electrode group and the laminate film.

Further, the nonaqueous electrolyte was poured into the electrode group housed in the laminate bag in an amount of 4.8 g/Ah of the battery capacity so as to assemble a thin type nonaqueous electrolyte secondary battery constructed as shown in FIGS. 1 and 2.

Finally, 4.2V constant voltage charging was applied to the nonaqueous electrolyte secondary battery for 12 hours at a current of 0.2 C under a high temperature environment of 45° C. as the initial charge process so as to obtain a nonaqueous electrolyte secondary battery.

EXAMPLE 2

A nonaqueous electrolyte secondary battery was prepared as in Example 1, except that 92 parts by weight of carbonaceous material A was mixed with 8 parts by weight of carbonaceous material B.

EXAMPLE 3

Prepared as carbonaceous material A was a mesophase pitch based carbon fiber subjected to a heat treatment at 3,000° C. The carbon fiber had a fiber diameter of 8 μm, an average fiber length of 20 μm, an average layer spacing $d_{002}$ derived from (002) reflection, which is obtained by a powder X-ray diffraction, of 0.3363 nm, and a specific surface area determined by a BET method of 0.9 $m^2$/g. Also prepared as carbonaceous material B was a mesophase pitch based carbon fiber subjected to a heat treatment at 700° C. The carbon fiber had a fiber diameter of 8 μm, an average fiber length of 20 μm, an average layer spacing $d_{002}$ derived from (002) reflection, which is obtained by a powder X-ray diffraction, of 0.36 nm, and a specific surface area determined by a BET method of 2.5 $m^2$/g. 89% by weight (95 parts by weight) of carbonaceous material A was mixed with 4% by weight (5 parts by weight) of carbonaceous material B. Then, a slurry was prepared by adding 7% by weight of polyvinylidene fluoride (PVdF) used as a binder and N-methyl-2-pyrrolidone (NMP) used as a solvent to the mixture of carbonaceous materials A and B. Further, both surfaces of a current collector formed of a copper foil having a thickness of 12 μm were coated with the resultant slurry, followed by drying and pressing the current collector coated with the slurry so as to prepare a negative electrode having an electrode density of 1.33 g/cm$^3$.

Then, a nonaqueous electrolyte secondary battery was assembled as in Example 1, except that the negative electrode prepared as above was incorporated in the nonaqueous electrolyte secondary battery.

EXAMPLE 4

Prepared as carbonaceous material A was a mesophase pitch based carbon fiber subjected to a heat treatment at 3,000° C. The carbon fiber had a fiber diameter of 8 μm, an average fiber length of 20 μm, an average layer spacing $d_{002}$ derived from (002) reflection, which is obtained by a powder X-ray diffraction, of 0.3360 nm, and a specific surface area determined by a BET method of 1 $m^2$/g. Also prepared as carbonaceous material B was a mesophase pitch based carbon fiber subjected to a heat treatment at 900° C. The carbon fiber had a fiber diameter of 8 μm, an average fiber length of 20 μm, an average layer spacing $d_{002}$ derived from (002) reflection, which is obtained by a powder X-ray diffraction, of 0.358 nm, and a specific surface area determined by a BET method of 2.2 $m^2$/g. 86% by weight (92 parts by weight) of carbonaceous material A was mixed with 7% by weight (8 parts by weight) of carbonaceous material B. Then, a slurry was prepared by adding 7% by weight of polyvinylidene fluoride (PVdF) used as a binder and N-methyl-2-pyrrolidone (NMP) used as a solvent to the mixture of carbonaceous materials A and B. Further, both surfaces of a current collector formed of a copper foil having a thickness of 12 μm were coated with the resultant slurry, followed by drying and pressing the current collector coated with the slurry so as to prepare a negative electrode having an electrode density of 1.36 g/cm³.

Then, a nonaqueous electrolyte secondary battery was assembled as in Example 1, except that the negative electrode prepared as above was incorporated in the nonaqueous electrolyte secondary battery.

EXAMPLE 5

Prepared as carbonaceous material A was a mesophase pitch based carbon fiber subjected to a heat treatment at 3,000° C. The carbon fiber had a fiber diameter of 8 μm, an average fiber length of 20 μm, an average layer spacing $d_{002}$ derived from (002) reflection, which is obtained by a powder X-ray diffraction, of 0.3360 nm, and a specific surface area determined by a BET method of 1 m²/g. Also prepared as carbonaceous material B was a polyperinaphthalene sintered body obtained by subjecting to a heat treatment at 700° C. under an argon gas atmosphere. The sintered body had an average layer spacing $d_{002}$ derived from (002) reflection, which is obtained by a powder X-ray diffraction, of 0.365 nm, and a specific surface area determined by a BET method of 3.2 m²/g. 89% by weight (95 parts by weight) of carbonaceous material A was mixed with 4% by weight (5 parts by weight) of carbonaceous material B. Then, a slurry was prepared by adding 7% by weight of polyvinylidene fluoride (PVdF) used as a binder and N-methyl-2-pyrrolidone (NMP) used as a solvent to the mixture of carbonaceous materials A and B. Further, both surfaces of a current collector formed of a copper foil having a thickness of 12 μm were coated with the resultant slurry, followed by drying and pressing the current collector coated with the slurry so as to prepare a negative electrode having an electrode density of 1.30 g/cm³.

Then, a nonaqueous electrolyte secondary battery was assembled as in Example 1, except that the negative electrode prepared as above was incorporated in the nonaqueous electrolyte secondary battery.

EXAMPLE 6

<Preparation of Gel Electrolyte>

A nonaqueous solvent was prepared by mixing ethylene carbonate (EC) and γ-butyrolactone (GBL) at a volume ratio of 1 (EC):1 (GBL). Then, a nonaqueous electrolyte was prepared by dissolving lithium tetrafluoro borate (LiBF₄) in the resultant mixed solvent in a concentration of 1.5 mol/L. Further, a paste was prepared by mixing the nonaqueous electrolyte thus prepared with a solution prepared by dissolving polyvinylidene fluoride-hexafluoro propylene (PVdF-HEP) in tetrahydrofuran (THF). A substrate was coated with the paste thus prepared, followed by drying the paste so as to obtain a thin film providing a gel-like electrolyte precursor.

<Preparation of Electrode Group>

A band-like positive electrode lead was welded to the current collector of the positive electrode similar to that prepared in Example 1, and a band-like negative electrode lead was welded to the current collector of the negative electrode similar to that prepared in Example 1, followed by spirally winding the positive electrode and the negative electrode with the thin film noted above interposed therebetween and subsequently forming the resultant structure in a flat shape so as to obtain an electrode group.

The electrode group thus prepared was dipped in the nonaqueous electrolyte described above so as to plasticize the thin film under a reduced pressure, thereby obtaining an electrode group in which the gel electrolyte was interposed between the positive electrode and the negative electrode.

On the other hand, a laminate film having a thickness of 0.1 mm, in which both surfaces of an aluminum foil were covered with polypropylene, was formed into a bag, and the electrode group noted above was housed in the laminate bag so as to assemble a thin type nonaqueous electrolyte secondary battery.

Finally, a 4.2V constant voltage charging was applied to the nonaqueous electrolyte secondary battery for 12 hours at a current of 0.2 C under a high temperature environment of 45° C. as the initial charge process so as to obtain a nonaqueous electrolyte, secondary battery.

EXAMPLE 7

<Preparation of Polymer Gel Electrolyte>

A nonaqueous solvent was prepared by mixing ethylene carbonate (EC) and γ-butyrolactone (GBL) at a volume ratio of 2 (EC):3 (GBL). Then, a nonaqueous electrolyte was prepared by dissolving lithium tetrafluoro borate (LiBF₄) in the resultant mixed solvent in a concentration of 1.5 mol/L. Further, a thin film providing a polymer gel electrolyte precursor was obtained by mixing the nonaqueous electrolyte with a solution of acrylate monomer, followed by polymerizing the acrylate monomer and chemically crosslinking the formed polymer.

<Preparation of Electrode Group>

A band-like positive electrode lead was welded to the current collector of the positive electrode similar to that prepared in Example 1, and a band-like negative electrode lead was welded to the current collector of the negative electrode similar to that prepared in Example 1, followed by spirally winding the positive electrode and the negative electrode with the thin film noted above interposed therebetween and subsequently forming the resultant structure in a flat shape so as to obtain an electrode group.

The electrode group thus prepared was dipped in the nonaqueous electrolyte described above so as to plasticize the thin film under a reduced pressure, thereby obtaining an electrode group in which the polymer gel electrolyte was interposed between the positive electrode and the negative electrode.

On the other hand, a laminate film having a thickness of 0.1 mm, in which both surfaces of an aluminum foil were covered with polypropylene, was formed into a bag, and the electrode group noted above was housed in the laminate bag so as to assemble a thin type nonaqueous electrolyte secondary battery.

Finally, a 4.2V constant voltage charging was applied to the nonaqueous electrolyte secondary battery for 12 hours at a current of 0.2 C under a high temperature environment of 45° C. as the initial charge process so as to obtain a nonaqueous electrolyte secondary battery.

EXAMPLE 8

A nonaqueous electrolyte secondary battery was prepared as in Example 1, except that a 4.2V constant voltage charging was applied to the nonaqueous electrolyte secondary battery for 12 hours at a current of 0.2 C under room temperature.

EXAMPLE 9

A nonaqueous electrolyte secondary battery was prepared as in Example 1, except that 96 parts by weight of carbonaceous material A was mixed with 4 parts by weight of carbonaceous material B.

EXAMPLE 10

A nonaqueous electrolyte secondary battery was prepared as in Example 1, except that 94 parts by weight of carbonaceous material A was mixed with 6 parts by weight of carbonaceous material B.

EXAMPLE 11

A nonaqueous electrolyte secondary battery was prepared as in Example 1, except that 90 parts by weight of carbonaceous material A was mixed with 10 parts by weight of carbonaceous material B.

EXAMPLE 12

A nonaqueous electrolyte secondary battery was prepared as in Example 1, except that 80 parts by weight of carbonaceous material A was mixed with 20 parts by weight of carbonaceous material B.

EXAMPLE 13

A nonaqueous electrolyte secondary battery was prepared as in Example 1, except that 50 parts by weight of carbonaceous material A was mixed with 50 parts by weight of carbonaceous material B.

EXAMPLE 14

A nonaqueous electrolyte secondary battery was prepared as in Example 1, except that carbonaceous material B alone was used as the carbonaceous material of the negative electrode.

EXAMPLE 15

A nonaqueous electrolyte secondary battery was prepared as in Example 1, except that a mixture consisting essentially of 75 parts by weight of carbonaceous material A equal to that used in Example 1, 20 parts by weight of a synthetic graphite used as a second carbonaceous material A, and 5 parts by weight of carbonaceous material B equal to that used in Example 1 was used as the carbonaceous material of the negative electrode. Incidentally, the synthetic graphite noted above had an average layer spacing $d_{002}$ derived from (002) reflection, which was obtained by a powder X-ray diffraction, of 0.3358 nm, an average particle diameter of 6 μm, and a specific surface area determined by a BET method of 15 m$^2$/g.

EXAMPLE 16

A nonaqueous electrolyte secondary battery was prepared as in Example 1, except that a mixture consisting essentially of 95 parts by weight of carbonaceous material A equal to that used in Example 1 and 5 parts by weight of carbonaceous material B described below was used as the carbonaceous material of the negative electrode.

A carbon material obtained by applying a heat treatment to polyacene at 550° C. was used as carbonaceous material B. The carbon material providing carbonaceous material B had an average layer spacing $d_{002}$ derived from (002) reflection, which was obtained by a powder X-ray diffraction, of 0.41 nm and a specific surface area determined by a BET method of 6.5 m$^2$/g.

Comparative Example 1

A nonaqueous electrolyte secondary battery was prepared as in Example 1, except that carbonaceous material A alone was used as the carbonaceous material of the negative electrode.

Comparative Example 2

Ethylene carbonate (EC) was mixed with methyl ethyl carbonate (MEC) at a mixing ratio by volume of 1:2 so as to prepare a mixed solvent. Then, lithium hexafluoro borate (LiPF$_6$) was dissolved in the mixed solvent in a concentration of 1.0 mol/L so as to prepare a nonaqueous electrolyte. Further, a nonaqueous electrolyte secondary battery was prepared as in Example 1, except that used was the nonaqueous electrolyte thus prepared.

Comparative Example 3

Ethylene carbonate (EC) was mixed with methyl ethyl carbonate (MEC) at a mixing ratio by volume of 1:2 so as to prepare a mixed solvent. Then, lithium hexafluoro borate (LiPF$_6$) was dissolved in the mixed solvent in a concentration of 1.0 mol/L so as to prepare a nonaqueous electrolyte. Further, a nonaqueous electrolyte secondary battery was prepared as in Example 1, except that used was the nonaqueous electrolyte thus prepared and carbonaceous material A equal to that used in Example 1 as the carbonaceous material of the negative electrode.

The battery characteristics of the secondary batteries prepared in Examples 1 to 16 and Comparative Examples 1 to 3 were evaluated as described below, with the results as shown in Table 4.

1) Initial Discharge Capacity and Cycle Life Characteristics

A charge-discharge cycle test was conducted under an atmosphere of 20° C., in which each of the secondary batteries obtained in Examples 1 to 16 and Comparative Examples 1 to 3 was charged for 5 hours to 4.2V under a charging current of 300 mA, followed by discharging the secondary battery to 2.7V under a current of 300 mA so as to measure the capacity retention rate at the 300 th charge-discharge cycles (the discharge capacity at the first charge-discharge cycle being set at 100%). Table 4 shows the results together with the discharge capacity at the first charge-discharge cycle (initial discharge capacity).

2) Self-discharge Characteristics

Figure 3:
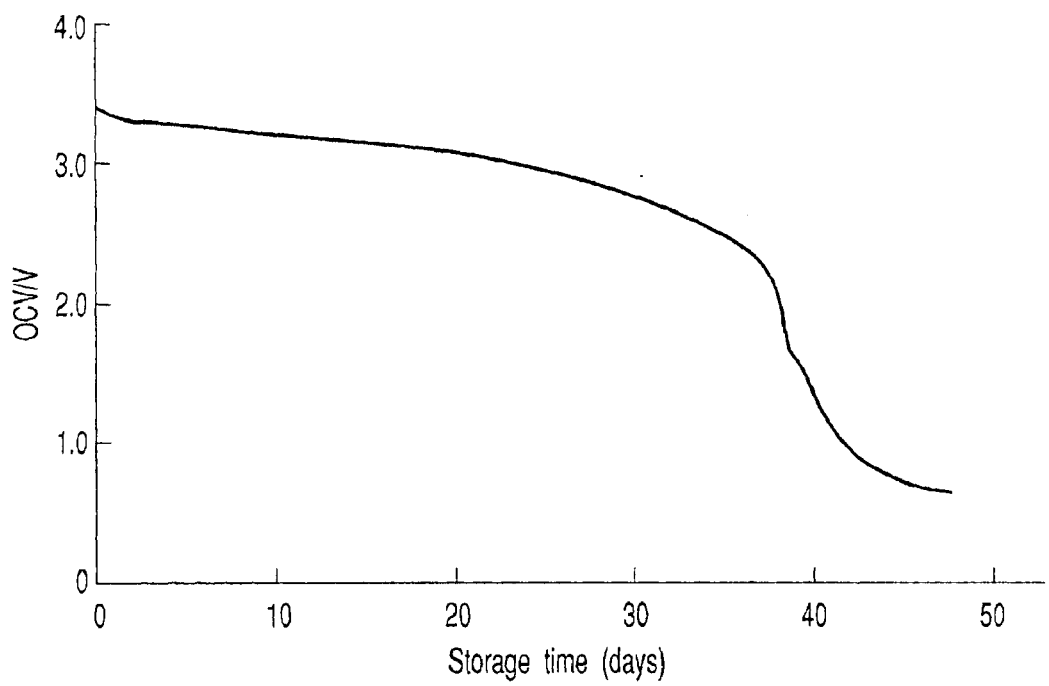
FIG. 3 is a graph showing the change with time in the open circuit voltage covering the case where the nonaqueous electrolyte secondary battery according to Example 1 of the present invention was stored at 60° C.

Each of the secondary batteries prepared in Examples 1 to 16 and Comparative Examples 1 to 3 was charged for 10 hours to 4.2V under a current of 0.2 C, followed by discharging the secondary battery at room temperature to 3V under a current of 0.2 C. Then, the secondary battery was left to stand in a constant temperature bath of 60° C. so as to monitor the battery voltage (open circuit voltage) and measure the time required for the battery voltage (open circuit voltage) to be lowered to 2V by the self-discharge. Table 4 shows the results together with voltage reduction in the case where the secondary battery was left to stand at 60° C. for 3 weeks. FIG. 3 is a graph showing the change with time in the open circuit voltage of the secondary battery for Example 1. In the graph of FIG. 3, the open circuit voltage is plotted in the ordinate. It should be noted that the open circuit voltage at the time when the secondary battery began to be left to stand in the constant temperature bath of 60° C. falls within a range of between 3.4V and 3.5V, which corresponds to 3V in terms of the battery voltage, i.e., the closed circuit voltage.

3) Swelling during Storage of Secondary Battery under Environment of 85° C.

In order to examine the swelling of the secondary battery during storage of the secondary battery under a high temperature environment and under a charged state, the constant current·constant voltage charging was performed for 3 hours to 4.2V under a current of 1 C and under an environment of 20° C., followed by leaving the secondary battery to stand within a constant temperature bath of 85° C. for 120 hours. Then, the secondary battery was taken out of the constant temperature bath and left to stand under an environment of 20° C. for 2 hours, followed by measuring the swelling of the secondary battery under bearing a load of 300 g on the battery surface. Table 4 also shows the results.

Also, the negative electrode characteristics of each of the secondary batteries prepared in Examples 1 to 16 and Comparative Examples 1 to 3 were measured as follows. Tables 1 to 3 show the results.

1) Solid State $^7$Li-NMR under Fully Charged State of 4.2V

Each of the secondary batteries prepared in Examples 1 to 16 and Comparative Examples 1 to 3, which were fully charged to 4.2V by the initial charging, was dismantled so as to take out the negative electrode. The carbonaceous material was scraped off from the current collector of the negative electrode. The carbonaceous material thus scraped off was washed for 10 minutes in a solvent such as methyl ethyl carbonate, which has a low boiling point and is capable of dissolving a lithium salt. The washing was repeated 3 times, followed by applying a vacuum drying to the washed carbonaceous material so as to obtain a powdery material. The powdery material thus obtained was diluted with a dehydrated alumina into a volume 2 to 10 times as much as the volume before dilution of the powdery material. The diluted powder material was loaded in a zircon tube having a diameter of 6 mm or 7 mm for measuring the solid state $^7$Li-NMR. For preventing the deactivation of the sample, all the sampling operations were carried out under an argon gas atmosphere. The measuring conditions in the case of using an apparatus of JNM-LA400WB manufactured by JEOL were as follows. Specifically, a magic angle spinning measurement was performed with $^7$Li used as the measuring nucleus and with the resonance frequency in the observing step set at 155.37 MHz. Concerning the reference substance, LiCl was used as an external standard. The measurement was performed at room temperature with the number of integrating operations set at 50 to 200 and with the pulse repetition time (pulse delay time) set at 2 seconds.

Since the peak caused by the sample deactivation during the measurement is measured around 0 ppm, the measurement was performed promptly, and confirming whether there is a further change with time in the peak.

Figure 4:
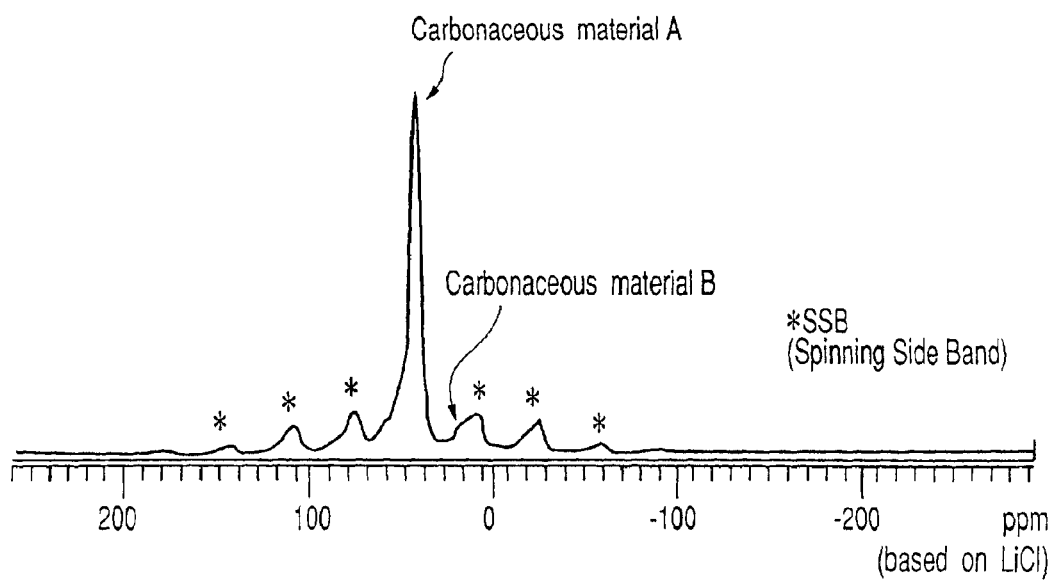
FIG. 4 shows an NMR spectrum of the carbonaceous material of the nonaqueous electrolyte secondary battery for Example 1 of the present invention.

Tables 1 to 3 show the shift values thus obtained together with the integrated intensity ratio $I_A/I_B$, where $I_A$ denotes the integrated intensity of the peak detected in the shift value of −1 to 20 ppm, with $I_B$ denoting the integrated intensity of the peak detected in the shift value of 40 to 50 ppm. Incidentally, FIG. 4 shows the NMR spectrum in respect of the carbonaceous material of the secondary battery for Example 1. As apparent from FIG. 4, in the secondary battery for Example 1, the peak derived from carbonaceous material A is detected in the shift value of 43 nm. On the other hand, the peak derived from carbonaceous material B, which certainly overlaps with SSB (Spinning Side Band) of the peak of carbonaceous material A, is detected in the shift value of 17 nm. Also, in Example 14, a peak of the shift value of 40 to 50 ppm derived from carbonaceous material A was not detected. On the other hand, a peak of the shift value of −1 to 20 ppm derived from carbonaceous material B was not detected in each of Comparative Examples 1 and 3.

2) Discharge Capacity of Negative Electrode (C20/C60, C60/C85)

Each of the secondary batteries after the initial charging for Examples 1 to 16 and Comparative Examples 1 to 3 was dismantled so as to take out the negative electrode. The negative electrode thus taken out was charged at 20° C. to 0.01V versus Li with a current of 0.2 C, followed by discharging the negative electrode at 20° C. to 1.5V versus Li with a current of 0.2 C by the method described below so as to measure the capacity C20 of the negative electrode. Likewise, the negative electrode was charged at 60° C. to 0.01V versus Li with a current of 0.2 C, followed by discharging the negative electrode at 60° C. to 1.5V versus Li with a current of 0.2 C by the method described below so as to measure the capacity C60 of the negative electrode. Further, the negative electrode was charged at 85° C. to 0.01V versus Li with a current of 0.2 C, followed by discharging the negative electrode at 85° C. to 1.5V versus Li with a current of 0.2 C by the method described below so as to measure the capacity C85 of the negative electrode. A ratio of the capacity C20 thus measured to the capacity C60 thus measured, i.e., C20/C60, and a ratio of the capacity C60 thus measured to the capacity C85 thus measured, i.e., C60/C85, were calculated, with the results as shown in Tables 1 to 3.

The capacity of the negative electrode of the secondary battery was examined in the following manner. That is, one product in a lot to be made available to users was used. This one was discharged to 3V at room temperature with a current of 0.2 C, and then decomposed to take out of its negative electrode. This negative electrode was subjected to the examination.

Specifically, before the examination, a piece of a predetermined size of the negative electrode comprising a current collector and a negative electrode layer supported on one surface or both surfaces of the current collector is cut out and washed with a solvent having a low boiling point such as methyl ethyl carbonate (MEC), followed by subjecting the washed piece of the negative electrode to a vacuum drying. Then, a three electrode cell comprising a negative electrode having a lead attached thereto, which is used as an operating electrode, and a counter electrode and a reference electrode each formed of the metal lithium is assembled, and the capacity test at each temperature is carried out by using a nonaqueous electrolyte prepared by dissolving 1.5M of LiBF$_4$ in a nonaqueous solvent prepared by mixing ethylene carbonate (EC) and γ-butyrolactone (GBL) at a mixing ratio of 1:2.

3) Remaining Lithium Amount in Negative Electrode (Wet Chemical Analysis)

Prepared were secondary batteries after the initial charging process for Examples 1 to 16 and Comparative Examples 1 to 3. Each of these secondary batteries was charged for 10 hours to 4.2V with a current of 0.2 C, followed by discharging at room temperature the secondary battery to 3V with a current of 0.2 C. Then, the secondary battery was dismantled so as to take out the negative electrode. The negative electrode thus taken out was washed with an organic solvent having a low boiling point such as methyl ethyl carbonate, dimethyl carbonate or diethyl carbonate so as to wash away the electrolyte attached to the surface of the negative electrode, followed by subjecting the washed negative electrode to a vacuum drying. After the drying, the carbonaceous material of the negative electrode was scratched off the current collector under an inert gas atmosphere, and 50 mg of the scratched sample was put in a pressurizing container made of polytetrafluoroethylene. Then, 7 ml of aqua regia was added to the scratched sample, followed by heating the diluted sample at 180° C. for 3 hours. Then, the diluted sample was cooled and transferred into a graduated flask. Then, the diluted sample was further diluted to become a certain amount. The resultant diluted solution was measured under a wavelength region of 768 nm by an atomic absorption method, and the lithium concentration in the carbonaceous material of the negative electrode was determined from the obtained value.

4) Solid State $^7$Li-NMR in Discharged State

Prepared were secondary batteries after the initial charging process for Examples 1 to 16 and Comparative Examples 1 to 3. Each of these secondary batteries was charged for 10 hours to 4.2V with a current of 0.2 C, followed by discharging the battery to 3V with a current of 0.2 C at room temperature. Then, the secondary battery was dismantled so as to take out the negative electrode. The subsequent operation was performed as in the solid state $^7$Li-NMR under the fully charged state so as to obtain the NMR spectrum. To reiterate, the carbonaceous material was scraped off the current collector of the negative electrode taken out of the dismantled secondary battery, followed by washing for 10 minutes the carbonaceous material thus scraped off in a solvent having a low boiling point such as methyl ethyl carbonate, which was capable of dissolving a lithium salt. The washing was repeated three times, followed by subjecting the washed carbonaceous material to a vacuum drying. The powdery material thus obtained was diluted with a dehydrated alumina into a volume 2 to 10 times as much as the volume before dilution of the powdery material. The diluted powder material was loaded in a zircon tube having a diameter of 6 mm or 7 mm for measuring the solid state $^7$Li-NMR. For preventing the deactivation of the sample, all the sampling operations were carried out under an argon gas atmosphere. The measuring conditions in the case of using an apparatus of JNM-LA400WB manufactured by JEOL were as follows. Specifically, a magic angle spinning measurement was performed with $^7$Li used as the measuring nucleus and with the resonance frequency in the observing step set at 155.37 MHz. Concerning the reference substance, LiCl was used as an external standard. The measurement was performed at room temperature with the number of integrating operations set at 50 to 200 and with the pulse repetition time (pulse delay time) set at 2 seconds.

Since the peak caused by the sample deactivation during the measurement is measured around 0 ppm, the measurement was performed promptly, and confirming whether there is a further change with time in the peak.

Of the two peaks appearing in the NMR spectrum, the sharper peak was called the main peak. The broader peak was called the subsidiary peak. In the NMR spectrum, a part of the waveform of the main peak overlapped the waveform of the subsidiary peak. Incidentally, the shift value in which the subsidiary peak was detected was close to the shift value in which the main peak was detected. The shift value in which the main peak were detected and the half-width of the main peak are shown in Tables 1 to 3.

Figure 5:
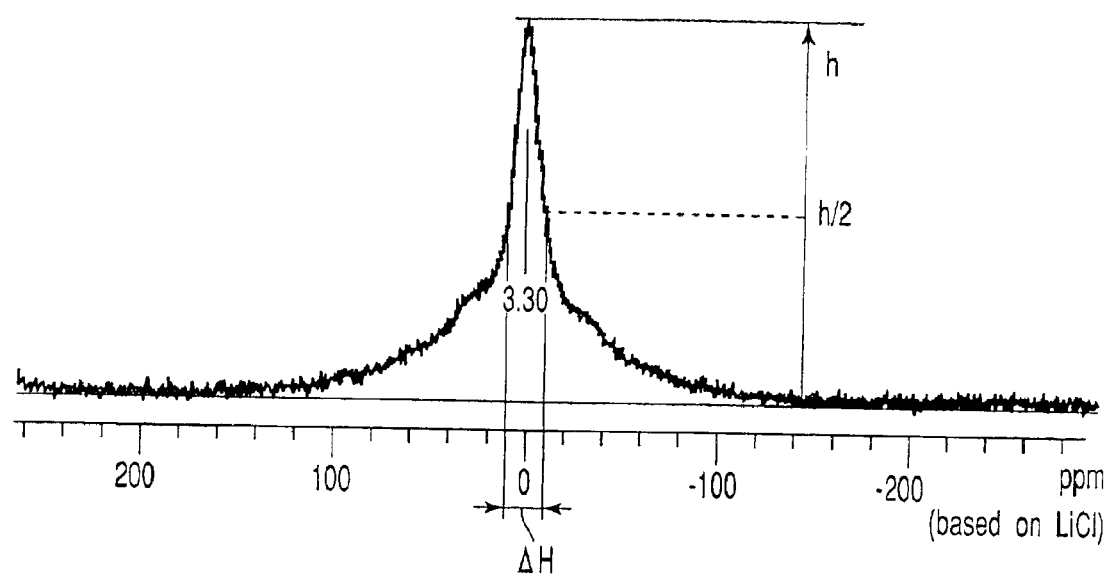
FIG. 5 shows an NMR spectrum of the carbonaceous material of the nonaqueous electrolyte secondary battery for Example 9 of the present invention.
Figure 6:
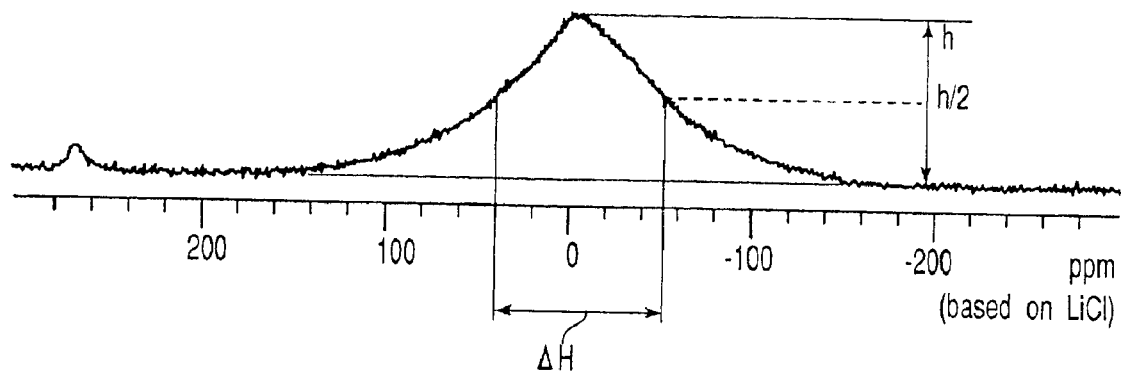
FIG. 6 shows an NMR spectrum of the carbonaceous material of the nonaqueous electrolyte secondary battery for Comparative Example 1.

FIG. 5 shows the NMR spectrum of the carbonaceous material for Example 9. As apparent from FIG. 5, the main peak was detected in the shift value of 3.3 ppm in the solid state $^7$Li-NMR spectrum measured by the MAS method (magic angle spinning method) for lithium absorbed in the carbonaceous material of the negative electrode of the secondary battery in the discharged state to 3V with a current of 0.2 C at room temperature in respect of the secondary battery for Example 9. It is also seen that the half-width ΔH of the main peak is 20.8 ppm. On the other hand, FIG. 6 shows the NMR spectrum of the carbonaceous material for Comparative Example 1. As apparent from FIG. 6, a broad peak alone derived from carbonaceous material A was detected in the shift value of −2.9 ppm in Comparative Example 1. It is also seen that the half-width ΔH of the peak was 92 ppm. Incidentally, in FIGS. 5 and 6, h represents the height of the main peak and h/2 represents the height corresponding to ½ of the height of the main peak. Further, in Example 14, only a sharp peak derived from carbonaceous material B was detected in the shift value of 3.6 ppm. Also, the half-width ΔH of the peak was 18 ppm.

5) Area Ratio of Main Peak

The area ratio of the main peak in the solid state $^7$Li-NMR spectrum under the discharged state was measured as follows in respect of the secondary batteries for Examples 1 to 13, 15, 16 and Comparative Example 2. Incidentally, the main peak was not detected in Example 14 and Comparative Examples 1 and 3 and, thus, the area ratio was not measured.

Figure 7:
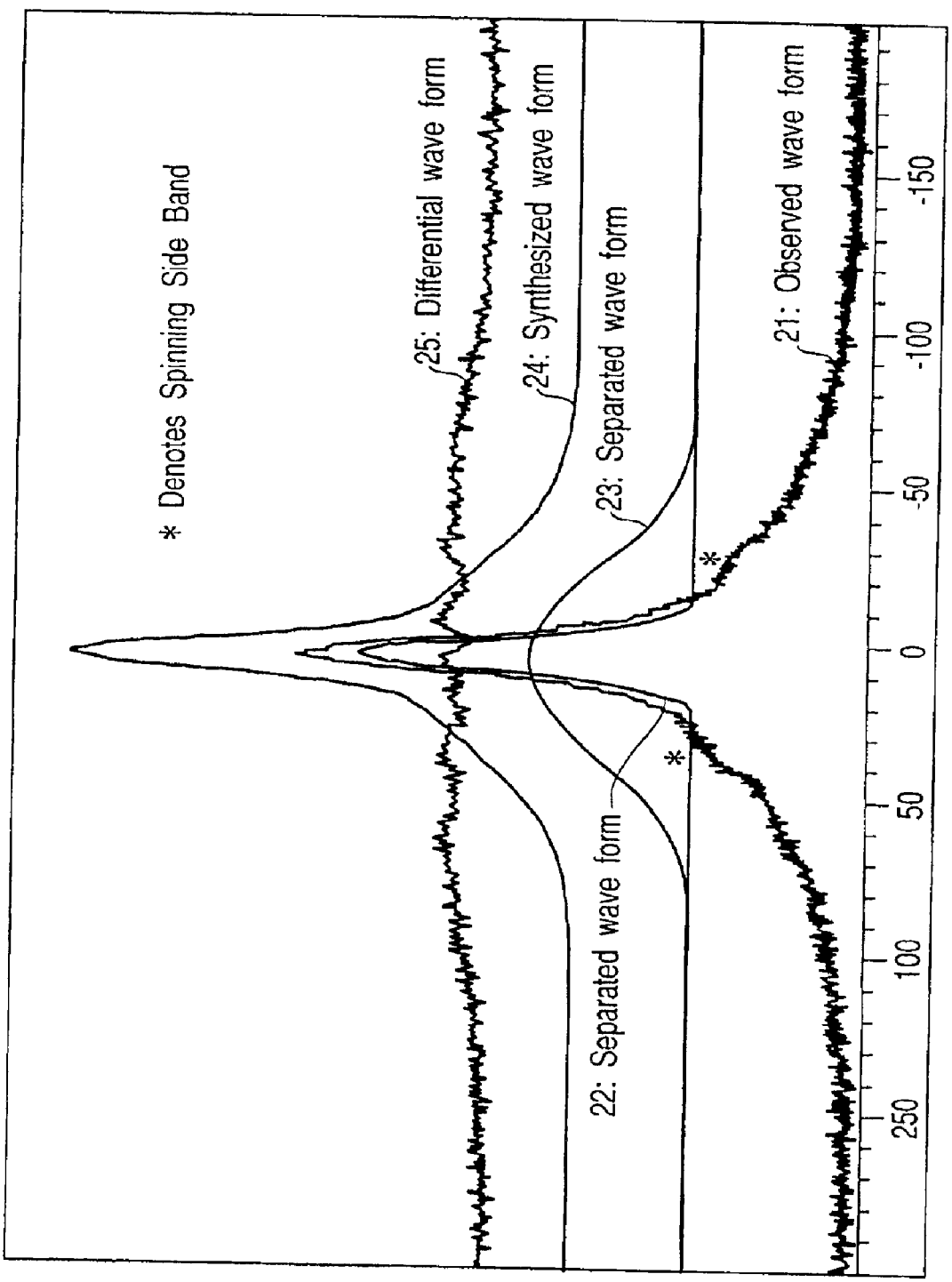
FIG. 7 shows the result of the peak analysis of the NMR spectrum shown in FIG. 5.

The measuring method will now be described with the secondary battery for Example 9 taken as an example. Specifically, two separated wave forms 22 and 23 are obtained by the known peak separating method from the NMR spectrum shown in FIG. 5, which corresponds to the observed wave form 21 shown in FIG. 7. The separated wave form 22 represents a comparatively sharp peak having a spinning side band and corresponds to the main peak. The separated wave form 22 is derived from carbonaceous material B. On the other hand, the separated wave form 23 represents a broad peak and corresponds to the subsidiary peak. The separated wave form 23 is derived from carbonaceous material A. Incidentally, a synthesized wave form 24 represents a wave form prepared by synthesizing the separated wave form 22 and the separated wave form 23. Further, a differential wave form 25 represents the deviation of the synthesized wave form 24 from the observed wave form 21.

Then, the peak area of the main peak 22 and the peak area of the subsidiary peak 23 were measured so as to calculate the peak area ratio of the main peak 22 based on the sum of the two peak areas. The results are also shown in Tables 1 to 3 given below:

TABLE 1

|  |  | Carbonaceous material A | | | Carbonaceous material B | | | Fully charged state NMR shift value (ppm) | Integrated intensity ratio $I_A/I_B$ |
|---|---|---|---|---|---|---|---|---|---|
|  |  | $d_{002}$ (nm) | Specific surface area (m²/g) | Parts by weight | $d_{002}$ (nm) | Specific surface area (m²/g) | Parts by weight | | |
| Examples | 1 | 0.3360 | 1 | 95 | 0.360 | 2.5 | 5 | 43, 17 | 0.12 |
|  | 2 | 0.3360 | 1 | 92 | 0.360 | 2.5 | 8 | 43, 17 | 0.23 |
|  | 3 | 0.3363 | 0.9 | 95 | 0.360 | 2.5 | 5 | 43, 17 | 0.13 |
|  | 4 | 0.3360 | 1 | 92 | 0.358 | 2.2 | 8 | 43, 19 | 0.15 |
|  | 5 | 0.3360 | 1 | 95 | 0.365 | 3.2 | 5 | 43, 12 | 0.23 |
|  | 6 | 0.3360 | 1 | 95 | 0.360 | 2.5 | 5 | 43, 17 | 0.12 |
|  | 7 | 0.3360 | 1 | 95 | 0.360 | 2.5 | 5 | 43, 17 | 0.12 |
|  | 8 | 0.3360 | 1 | 95 | 0.360 | 2.5 | 5 | 43, 17 | 0.12 |

TABLE 1-continued

|  |  | C20/C60 (%) | C60/C85 (%) | Remaining Li amount (wt %) | Half-width of main peak under discharged state (ppm) | Shift value of main peak under discharged state (ppm) | Area ratio of main peak under discharged state (%) |
|---|---|---|---|---|---|---|---|
| Examples | 1 | 95 | 98 | 1.43 | 21 | 3.5 | 40 |
|  | 2 | 92 | 97 | 1.68 | 20 | 3.6 | 60 |
|  | 3 | 95 | 98 | 1.44 | 22 | 3.5 | 40 |
|  | 4 | 92 | 97 | 1.4 | 20 | 3.4 | 45 |
|  | 5 | 95 | 98 | 1.54 | 24 | 3.6 | 50 |
|  | 6 | 95 | 98 | 1.47 | 21 | 3.5 | 40 |
|  | 7 | 95 | 98 | 1.48 | 21 | 3.5 | 40 |
|  | 8 | 98 | 98 | 1.25 | 21 | 3.2 | 30 |

*Liquid electrolyte for Examples 1 to 5 and 8 (initial charging at room temperature for Example 8); gel electrolyte for Example 6; polymer electrolyte for Example 7

TABLE 2

|  |  | Carbonaceous material A | | | Carbonaceous material B | | | Fully charged state NMR shift value (ppm) | Integrated intensity ratio $I_A/I_B$ |
|---|---|---|---|---|---|---|---|---|---|
|  |  | $d_{002}$ (nm) | Specific surface area (m²/g) | Parts by weight | $d_{002}$ (nm) | Specific surface area (m²/g) | Parts by weight |  |  |
| Examples | 9 | 0.3360 | 1 | 96 | 0.360 | 2.5 | 4 | 43, 17 | 0.1 |
|  | 10 | 0.3360 | 1 | 94 | 0.360 | 2.5 | 6 | 43, 17 | 0.16 |
|  | 11 | 0.3360 | 1 | 90 | 0.360 | 2.5 | 10 | 43, 17 | 0.28 |
|  | 12 | 0.3360 | 1 | 80 | 0.360 | 2.5 | 20 | 43, 17 | 0.63 |
|  | 13 | 0.3360 | 1 | 50 | 0.360 | 2.5 | 50 | 43, 17 | 2.5 |
|  | 14 | — | — | — | 0.360 | 2.5 | 100 | — 15 | — |
|  | 15 | 0.3360 0.3358 | 1 15 | 75 20 | 0.360 | 2.5 | 5 | 43, 17 | 0.12 |
|  | 16 | 0.3360 | 1 | 95 | 0.410 | 6.5 | 5 | 43, 10 | 0.16 |

|  |  | C20/C60 (%) | C60/C85 (%) | Remaining Li amount (wt %) | Half-width of main peak under discharged state (ppm) | Shift value of main peak under discharged state (ppm) | Area ratio of main peak under discharged state (%) |
|---|---|---|---|---|---|---|---|
| Examples | 9 | 97 | 98 | 1.35 | 20.8 | 3.3 | 30 |
|  | 10 | 94 | 97 | 1.5 | 21 | 3.5 | 45 |
|  | 11 | 92 | 97 | 1.8 | 21 | 3.6 | 75 |
|  | 12 | 90 | 95 | 3.5 | 20 | 3.5 | 96 |
|  | 13 | 78 | 93 | 10.0 | 20 | 3.7 | 98 |
|  | 14 | 65 | 92 | 20.0 | — | — | — |
|  | 15 | 95 | 98 | 1.41 | 21 | 3.5 | 40 |
|  | 16 | 90 | 92 | 2.3 | 12 | 2.0 | 55 |

TABLE 3

|  |  | Carbonaceous material A | | | Carbonaceous material B | | | Fully charged state NMR shift value (ppm) | Integrated intensity ratio $I_A/I_B$ |
|---|---|---|---|---|---|---|---|---|---|
|  |  | $d_{002}$ (nm) | Specific surface area (m²/g) | Parts by weight | $d_{002}$ (nm) | Specific surface area (m²/g) | Parts by weight |  |  |
| Comparative Examples | 1 | 0.3360 | 1 | 100 | — | — | — | 43, — | — |
|  | 2 | 0.3360 | 1 | 95 | 0.360 | 2.5 | 5 | 43, 17 | 0.12 |
|  | 3 | 0.3360 | 1 | 100 | — | — | — | 43, — | — |

|  |  | C20/C60 (%) | C60/C85 (%) | Remaining Li amount (wt %) | Half-width of main peak under discharged state (ppm) | Shift value of main peak under discharged state (ppm) | Area ratio of main peak under discharged state (%) |
|---|---|---|---|---|---|---|---|
| Comparative Examples | 1 | 100 | 100 | 0.9 | — | — | — |
|  | 2 | 95 | 98 | 1.43 | 21 | 3.5 | 40 |
|  | 3 | 100 | 100 | 0.9 | — | — | — |

TABLE 4

|  | Initial discharge capacity (mAh) | Capacity retention rate after 300 cycles (%) | Self-discharge characteristic (time to reach 2 V) | Voltage reduction in 3 weeks later (V) | Battery swelling (%) |
|---|---|---|---|---|---|
| Example 1 | 520 | 84 | 38 days | 0.6 | 2.5 |
| Example 2 | 518 | 82 | Not less than 50 days | 0.3 | 2.5 |
| Example 3 | 515 | 82 | 46 days | 0.4 | 2.5 |
| Example 4 | 510 | 85 | 27 days | 0.7 | 2.5 |
| Example 5 | 505 | 78 | Not less than 50 days | 0.3 | 2.5 |
| Example 6 | 510 | 72 | 40 days | 0.6 | 1.5 |
| Example 7 | 505 | 75 | 39 days | 0.6 | 1.5 |
| Example 8 | 518 | 84 | 21 days | 1.5 | 2.5 |
| Example 9 | 525 | 85 | 31 days | 0.7 | 2.5 |
| Example 10 | 520 | 84 | 44 days | 0.4 | 2.5 |
| Example 11 | 515 | 82 | Not less than 50 days | 0.3 | 2.5 |
| Example 12 | 480 | 78 | Not less than 50 days | 0.3 | 2.5 |
| Example 13 | 450 | 72 | Not less than 50 days | 0.3 | 2.5 |
| Example 14 | 400 | 57 | Not less than 50 days | 0.3 | 2.5 |
| Example 15 | 525 | 85 | 37 days | 0.6 | 2.5 |
| Example 16 | 480 | 75 | Not less than 50 days | 0.3 | 2.5 |
| Comparative Example 1 | 520 | 85 | 3 days | 3.0 | 2.5 |
| Comparative Example 2 | 525 | 86 | Not less than 50 days | 0.2 | 300% or broken case |
| Comparative Example 3 | 530 | 86 | Not less than 50 days | 0.2 | 300% or broken case |

As apparent from Tables 1 to 4, the time for the battery voltage to be lowered to reach 2V when stored under a high temperature environment of 60° C. after discharged with a current of 0.2 C to 3V under room temperature is at least 21 days in the secondary electrodes for Examples 1 to 16. Also, the voltage reduction during the storage of the secondary battery for 3 weeks is not larger than 1.5V. Particularly, the secondary batteries for Examples 1 to 11 and 15 exhibited a high initial discharge capacity exceeding 500 mAh.

On the other hand, the secondary battery for Comparative Example 1 using carbonaceous material A alone as the carbonaceous material of the negative electrode was certainly excellent in the initial discharge capacity and the capacity retention rate after 300 cycles of charge-discharge operation. However, the battery voltage when the secondary battery was stored under a high temperature environment of 60° C. after discharged at room temperature to 3V with a current of 2 C was lowered to 2V in only 3 days.

On the other hand, in each of the secondary batteries for Comparative Examples 2 and 3 using a nonaqueous electrolyte prepared by dissolving $LiPF_6$ in a mixed solvent consisting of ethylene carbonate (EC) and methyl ethyl carbonate (MEC), the swelling of the secondary battery when stored under a high temperature environment was found to be 300%, that is much greater than that for Examples 1 to 16. In some cases, the battery case was broken due to the gas pressure. Further, the self-discharge characteristics of the secondary battery for Comparative Example 2 using a carbonaceous material similar to that used in Example 1 was found to be substantially equal to that for Comparative Example 3 using a carbonaceous material similar to that used in Comparative Example 1. This clearly supports that, in the case of using a nonaqueous electrolyte that does not contain γ-butyrolactone, it is impossible to improve the self-discharge characteristics even in the case of using a carbonaceous material equal to that used in Example 1.

As described above in detail, the present invention provides a nonaqueous electrolyte secondary battery comprising a nonaqueous electrolyte containing γ-butyrolactone and capable of suppressing the self-discharge during storage of the secondary battery under high temperatures.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte secondary battery, comprising:

a case having a wall thickness not larger than 0.3 mm;

a positive electrode provided in said case;

a negative electrode provided in said case and comprising a carbonaceous material capable of absorbing-desorbing lithium ions; and a nonaqueous electrolyte provided in said case and comprising a nonaqueous solvent including γ-butyrolactone and a solute dissolved in said nonaqueous solvent, wherein formulas (1) and (2) given below are satisfied:

$$0.92 \times C_{60} \leq C_{20} \leq 0.98 \times C_{60} \quad (1)$$

and $$0.95 \times C_{85} \leq C_{60} \leq 0.98 \times C_{85} \quad (2),$$

where $C_{20}$ represents a negative electrode capacity obtained when said negative electrode of said secondary battery at the time of starting its use is charged to 0.01V versus Li with a current of 0.2 C at 20° C., followed by discharging the negative electrode to 1.5V versus Li with a current of 0.2 C at 20° C., $C_{60}$ represents a negative electrode capacity obtained when said negative electrode of said secondary battery at the time of starting its use is charged to 0.01V versus Li with a current of 0.2 C at 60° C., followed by discharging the negative electrode to 1.5V versus Li with a current of 0.2 C at 60° C., and $C_{85}$ represents a negative electrode capacity obtained when said negative electrode of said secondary battery at the time of starting its use is charged to 0.01 V versus Li with a current of 0.2 C at 85° C., followed by discharging the negative electrode to 1.5 V versus Li with a current of 0.2 C at 85° C.

2. The nonaqueous electrolyte secondary battery, according to claim 1, wherein after being discharged to 3V with a current of 0.2 C at room temperature, a voltage reduction caused by a self-discharge at 60° C. is not larger than 1.5V in 3 weeks.

3. The nonaqueous electrolyte secondary battery according to claim 2, wherein the voltage reduction caused by the self-discharge at 60° C. is not larger than 1V in 3 weeks.

4. The nonaqueous electrolyte secondary battery according to claim 1, where said negative electrode capacity $C_{20}$ and said negative electrode capacity $C_{60}$ satisfy formula (3) given below:

$$0.92 \times C_{60} \leq C_{20} \leq 0.95 \times C_{60} \qquad (3).$$

5. The nonaqueous electrolyte secondary battery according to claim 1, wherein a shift value of a peak derived from lithium absorbed in said carbonaceous material of said negative electrode under a state that the secondary battery is fully charged to 4.2V is detected in −1 to 20 ppm and 40 to 50 ppm in a solid state $^7$Li-NMR using a magic angle spinning method (MAS method).

6. The nonaqueous electrolyte secondary battery according to claim 5, which satisfies formula (4) given below:

$$0.08 \leq I_A/I_B \leq 0.4 \qquad (4)$$

where $I_A$ represents an integrated intensity of the peak detected in the shift value of −1 to 20 ppm, and $I_B$ represents an integrated intensity of the peak detected in the shift value of 40 to 50 ppm.

7. The nonaqueous electrolyte secondary battery according to claim 6, wherein lithium absorbed in said carbonaceous material of said negative electrode under a state that the secondary battery is discharged to 3V under a current of 0.2 C at room temperature exhibits a half-width of a main peak being 70 ppm (10,000 Hz) or less in a solid state $^7$Li-NMR spectrum measured by a magic angle spinning method (MAS method).

8. The nonaqueous electrolyte secondary battery according to claim 1, wherein said carbonaceous material comprises at least 90 parts by weight of carbonaceous material A having an average layer spacing $d_{002}$ derived from (002) reflection, which is obtained by a powder X-ray diffraction, of 0.337 nm or less and 1 to 10 parts by weight of carbonaceous material B having an average layer spacing $d_{002}$ derived from (002) reflection, which is obtained by a powder X-ray diffraction, of 0.36 to 0.4 nm.

9. The nonaqueous electrolyte secondary battery according to claim 8, wherein said average layer spacing $d_{002}$ of said carbonaceous material B falls within a range of between 0.36 nm and 0.38 nm.

10. The nonaqueous electrolyte secondary battery according to claim 8, wherein specific surface areas of said carbonaceous material A and said carbonaceous material B fall within a range of 0.1 m²/g to 5 m²/g.

11. The nonaqueous electrolyte secondary battery according to claim 1, wherein said carbonaceous material comprises at least 90 parts by weight of a first carbonaceous material obtained by subjecting a first carbonaceous material precursor to a heat treatment at 2,500° C. or more and 1 to 10 parts by weight of a second carbonaceous material obtained by subjecting a second carbonaceous material precursor to a heat treatment at 900° C. or less.

12. The nonaqueous electrolyte secondary battery according to claim 11, wherein said carbonaceous material precursor comprises at least one material selected from the group consisting of mesophase pitch, a mesophase pitch based carbon fiber and mesophase pitch based microbeads.

13. The nonaqueous electrolyte secondary battery according to claim 11, wherein the heat treatment temperature of said first carbonaceous material falls within a range of 2500 to 3000° C. and heat treatment temperature of said second carbonaceous material falls within a range of 600 to 900° C.

14. The nonaqueous electrolyte secondary battery according to claim 11, wherein specific surface areas of said first carbonaceous material and said second carbonaceous material fall within a range of 0.1 m²/g to 5 m²/g.

15. The nonaqueous electrolyte secondary battery according to claim 1, wherein lithium absorbed in said carbonaceous material of said negative electrode under a state that the secondary battery is discharged to 3V under a current of 0.2 C at room temperature exhibits a half-width of a main peak being 70 ppm (10,000 Hz) or less in a solid state $^7$Li-NMR spectrum measured by a magic angle spinning method (MAS method).

16. The nonaqueous electrolyte secondary battery according to claim 15, wherein a subsidiary peak is detected in said solid state $^7$Li-NMR spectrum, and a ratio of the peak area of said main peak to the sum of the peak area of said main peak and the peak area of said subsidiary peak area falls within a range of between 5% and 75%.

17. The nonaqueous electrolyte secondary battery according to claim 15, wherein the half-width of said main peak is 50 ppm or less.

18. A nonaqueous electrolyte secondary battery, comprising:

a case having a wall thickness not larger than 0.3 mm;

a positive electrode provided in said case;

a negative electrode provided in said case and comprising a carbonaceous material capable of absorbing-desorbing lithium ions; and a nonaqueous electrolyte provided in said case and comprising a nonaqueous solvent including γ-butyrolactone and a solute dissolved in said nonaqueous solvent, wherein a lithium remaining amount in said negative electrode under a state that the secondary battery is discharged to 3V under a current of 0.2 C at room temperature falls within a range of between 1.1% by weight and 2% by weight based on said carbonaceous material.

19. The nonaqueous electrolyte secondary battery according to claim 18, wherein said lithium remaining amount falls within a range of between 1.1% by weight and 1.8% by weight based on said carbonaceous material.

20. The nonaqueous electrolyte secondary battery according to claim 18, wherein said case is substantially formed of a material selected from the group consisting of a sheet including a resin layer, a metal plate and a metal film.

21. The nonaqueous electrolyte secondary battery according to claim 18, wherein a volume ratio said γ-butyrolactone in said nonaqueous solvent falls within a range of between 20% by volume and 80% by volume.

22. The nonaqueous electrolyte secondary battery according to claim 18, wherein said nonaqueous electrolyte is substantially in the form of a liquid or a gel.

23. The nonaqueous electrolyte secondary battery according to claim 18, wherein after being discharged to 3V with a current of 0.2 C at room temperature, a voltage reduction caused by a self-discharge at 60° C. is not larger than 1.5V in 3 weeks.

24. The nonaqueous electrolyte secondary battery according to claim 18, wherein a shift value of a peak derived from lithium absorbed in the carbonaceous material of the negative electrode under a state that the secondary battery is fully charged to 4.2V is detected in −1 to 20 ppm and 40 to 50 ppm in a solid state $^7$Li-NMR using a magic angle spinning method (MAS method).

25. The nonaqueous electrolyte secondary battery according to claim 18, wherein the carbonaceous material comprises at least 90 parts by weight of carbonaceous material A having an average layer spacing $d_{002}$ derived from (002) reflection, which is obtained by a powder X-ray diffraction, of 0.337 nm or less and 1 to 10 parts by weight of carbonaceous material B having an average layer spacing $d_{002}$ derived from (002) reflection, which is obtained by a powder X-ray diffraction, of 0.36 to 0.4 nm.

26. The nonaqueous electrolyte secondary battery according to claim 18, wherein the carbonaceous material comprises at least 90 parts by weight of a first carbonaceous material obtained by subjecting a first carbonaceous material precursor to a heat treatment at 2,500° C. or more and 1 to 10 parts by weight of a second carbonaceous material obtained by subjecting a second carbonaceous material precursor to a heat treatment at 900° C. or less.

27. The nonaqueous electrolyte secondary battery according to claim 18, wherein lithium absorbed in the carbonaceous material of the negative electrode under a state that the secondary battery is discharged to 3V under a current of 0.2 C at room temperature exhibits a half-width of a main peak being 70 ppm (10,000 Hz) or less in a solid state $^7$Li-NMR spectrum measured by a magic angle spinning method (MAS method).

* * * * *